(12) United States Patent
Xiu et al.

(10) Patent No.: US 11,968,358 B2
(45) Date of Patent: *Apr. 23, 2024

(54) COMPLEXITY REDUCTION AND BIT-WIDTH CONTROL FOR BI-DIRECTIONAL OPTICAL FLOW

(71) Applicant: Vid Scale, Inc., Wilmington, DE (US)

(72) Inventors: Xiaoyu Xiu, San Diego, CA (US); Yuwen He, San Diego, CA (US); Yan Ye, San Diego, CA (US); Jiancong Luo, Skillman, NJ (US)

(73) Assignee: Vid Scale, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,928

(22) Filed: Oct. 10, 2022

(65) Prior Publication Data
US 2023/0050213 A1 Feb. 16, 2023

Related U.S. Application Data

(63) Continuation of application No. 17/276,448, filed as application No. PCT/US2019/051560 on Sep. 17, 2019, now Pat. No. 11,470,308.
(Continued)

(51) Int. Cl.
*H04N 7/12* (2006.01)
*H04N 19/105* (2014.01)
(Continued)

(52) U.S. Cl.
CPC ......... *H04N 19/105* (2014.11); *H04N 19/132* (2014.11); *H04N 19/146* (2014.11);
(Continued)

(58) Field of Classification Search
CPC .. H04N 19/105; H04N 19/132; H04N 19/146; H04N 19/159; H04N 19/176;
(Continued)

(56) References Cited

U.S. PATENT DOCUMENTS 10,986,367 B2 * 4/2021 Lee .................. H04N 19/52
11,206,419 B2 * 12/2021 Lee .................. H04N 19/513
(Continued)

FOREIGN PATENT DOCUMENTS

| CN | 107646195 | 1/2018 |
|----|-----------|--------|
| JP | H06168239 | 6/1994 |

(Continued)

OTHER PUBLICATIONS

ITU-T Recommendation H.264 and ISO/IEC/MPEG-4 part 10, "Advanced Video Coding for Generic Audiovisual Services", Series H: Audiovisual and Multimedia Systems, Infrastructure of audiovisual services—Coding of moving video, Nov. 2007, 564 pages.
(Continued)

*Primary Examiner* — Gims S Philippe
(74) *Attorney, Agent, or Firm* — Klintworth & Rozenblat IP LLP

(57) ABSTRACT

Systems and methods are described for reducing the complexity of using bi-directional optical flow (BIO) in video coding. In some embodiments, bit-width reduction steps are introduced in the BIO motion refinement process to reduce the maximum bit-width used for BIO calculations. In some embodiments, simplified interpolation filters are used to generate predicted samples in an extended region around a current coding unit. In some embodiments, different interpolation filters are used for vertical versus horizontal interpolation. In some embodiments, BIO is disabled for coding units with small heights and/or for coding units that are predicted using a sub-block level inter prediction technique, such as advanced temporal motion vector prediction (ATMVP) or affine prediction.

20 Claims, 12 Drawing Sheets

Related U.S. Application Data

(60) Provisional application No. 62/789,331, filed on Jan. 7, 2019, provisional application No. 62/738,655, filed on Sep. 28, 2018, provisional application No. 62/734,763, filed on Sep. 21, 2018.

(51) Int. Cl.
| | |
|---|---|
| *H04N 19/132* | (2014.01) |
| *H04N 19/146* | (2014.01) |
| *H04N 19/159* | (2014.01) |
| *H04N 19/176* | (2014.01) |
| *H04N 19/513* | (2014.01) |

(52) U.S. Cl.
CPC ......... *H04N 19/159* (2014.11); *H04N 19/176* (2014.11); *H04N 19/513* (2014.11)

(58) Field of Classification Search
CPC .... H04N 19/513; H04N 19/563; H04N 19/52; H04N 19/577
USPC .................................................. 375/240.02
See application file for complete search history.

(56) References Cited

U.S. PATENT DOCUMENTS

| | | |
|---|---|---|
| 2013/0028530 A1 | 1/2013 | Drugeon |
| 2018/0192072 A1 | 7/2018 | Chen |
| 2018/0241998 A1 | 8/2018 | Chen |
| 2018/0376166 A1 | 12/2018 | Chuang |
| 2019/0138889 A1* | 5/2019 | Jiang ...................... G06N 3/045 |
| 2019/0273938 A1 | 9/2019 | Abe |
| 2020/0128264 A1* | 4/2020 | Wang ..................... G06F 3/0604 |
| 2020/0221122 A1* | 7/2020 | Ye ......................... H04N 19/176 |
| 2020/0280735 A1 | 9/2020 | Lim |

FOREIGN PATENT DOCUMENTS

| | | |
|---|---|---|
| KR | 1020180043787 | 4/2018 |
| TW | 201826791 | 7/2018 |
| WO | 2011129084 | 10/2011 |
| WO | 2018113658 | 6/2018 |
| WO | 2018166357 | 9/2018 |
| WO | 2019238008 | 12/2019 |
| WO | 2020035054 | 2/2020 |

OTHER PUBLICATIONS

Bross, et. al., "High Efficiency Video Coding (HEVC) Text Specification Draft 10 (for FDIS and Last Call)". Joint Collaborative Team on Video Coding (JCT-VC), Document No. JCTVC-L1003, Jan. 2013, 310 pages.
Alshina, E., et. al., "Known Tools Performance Investigation for Next Generation Video Coding". ITU—Telecommunications Standardization Sector, SG16/Q6, Video Coding Experts Group (VCEG), Jun. 2015, VCEG-AZ05, 7 pages.
Alshin, Alexander, et. al., "Bi-directional Optical Flow for Future Video Codec". IEEE Data Compression Conference (DCC), (2016), pp. 83-90.
Wikipedia, "Karatsuba Algorithm". Wikipedia web article, available at: https://web.archive.org/web/20170303213652/ https://en.wikipedia.org/wiki/Karatsuba algorithm, Mar. 2017 (5 pages).
Xiu, Xiaoyu, et. al., "CE9-Related: Complexity Reduction and Bit-Width Control for Bi-Directional Optical Flow (BIO)". Joint Video Experts Team (JVET) of ITU-T SG 16 WP 3 and ISO/IEC JTC 1/SC 29/WG 11, JVET-L0256, Oct. 3-12, 2018, pp. 1-13.
Xiu, Xiaoyu, et. al., "CE9-Related: A simplified design of bi-direction optical flow (BIO)". JVET Meeting, JVET-L0591, 12th meeting Oct. 2018 (9 pages).
International Search Report and Written Opinion of the International Searching Authority for PCT/US2019/051560 dated Dec. 4, 2019, 13 pages.
Segall, Andrew, et. al. "Joint Call for Proposals on Video Compression With Capability Beyond HEVC". Joint Video Exploration Team (JVET) of ITU-T SG 16 WP 3 and ISO/IEC JTC 1/SC 29/WG 11, JVET-H1002-v6, Oct. 18-24, 2017, 27 pages.
Bross, Benjamin, et. al., "Versatile Video Coding (Draft 2)". Joint Video Experts Team (JVET) of ITU-T SG 16 WP 3 and ISO/IEC JTC 1/SC 29/WG 11, JVET-K1001-v6, Jul. 2018, 140 pages.
Jeong, Seungsoo, et. al., "CE4 Ultimate Motion Vector Expression (Test 4.5.4)". Joint Video Experts Team (JVET) of ITU-T SG 16 WP 3 and ISO/IEC JTC 1/SC 29/WG 11, JVET-L0054, Oct. 2018, 6 pages.
Jeong, Seungsoo, et. al., "Proposed WD for CE4 Ultimate motion vector expression (Test 4.5.4)". Joint Video Experts Team (JVET) of ITU-T SG 16 WP 3 and ISO/IEC JTC 1/SC 29/WG 11, JVET-L0054_WD, Oct. 2018, 12 pages.
Chiang, Man-Shu, et. al., "CE10.1.1: Multi-Hypothesis Prediction for Improving AMVP Mode, Skip or Merge Mode, and Intra Mode". Joint Video Experts Team (JVET)of ITU-T SG 16 WP 3 and ISO/IEC JTC 1/SC 29/WG 11, JVET-L0100-v3, Oct. 2018, 14 pages.
Chiang, Man-Shu, et. al., "CE10.1.1: Multi-Hypothesis Prediction for Improving AMVP Mode, Skip or Merge Mode, and Intra Mode". Joint Video Experts Team (JVET)of ITU-T SG 16 WP 3 and ISO/IEC JTC 1/SC 29/WG 11, JVET-L0100-v3, Power Point Presentation, Oct. 2018, 12 pages.
Winken, Martin, et. al., "CE10-Related: Multi-Hypothesis Inter Prediction with simplified AMVP Process". Joint Video Experts Team (JVET) of ITU-T SG 16 WP 3 and ISO/IEC JTC 1/SC 29/WG 11, JVET-L0679-v2, Oct. 2018, 4 pages.
Winken, Martin, et. al., "CE10-Related: Multi-Hypothesis Inter Prediction with simplified AMVP Process". Joint Video Experts Team (JVET) of ITU-T SG 16 WP 3 and ISO/IEC JTC 1/SC 29/WG 11, JVET-L0679-v2, Power Point Presentation, Oct. 2018, 7 pages.
Esenlik, Semih, et. al., "Simplified DMVR for Inclusion in VVC". Joint Video Experts Team (JVET) of ITU-T SG 16 WP 3 and ISO/IEC JTC 1/SC 29/WG 11, JVET-L0670, Oct. 2018, 5 pages.
SMPTE 421M, "VC-1 Compressed Video Bitstream Format and Decoding Process". SMPTE Standard, 2006, (493 pages).
Chen, Jianle, et. al., "Coding Tools Investigation for Next Generation Video Coding". ITU-Telecommunication Standardization Sector, Study Group 16, Contribution 806, COM16-C806, Jan. 2015, pp. 1-7.
Karczewicz, M., et. al., "Report of AHG1 on Coding Efficiency Improvements". ITU—Telecommunications Standardization Sector, Video Coding Experts Group (VCEG), SG16/Q6, VCEG-AZ01, Jun. 2015, 2 pages.
Ohm, Jens-Rainer., et. al., "Report of AHG on Future Video Coding Standardization Challenges". International Organization for Standardization, Coding of Moving Pictures and Audio, ISO/IEC JTC1/SC29/WG11 MPEG2014/M36782, Jun. 2015, 4 pages.
International Preliminary Report on Patentability for PCT/US2019/051560 dated Mar. 23, 2021, 9 pages.

* cited by examiner

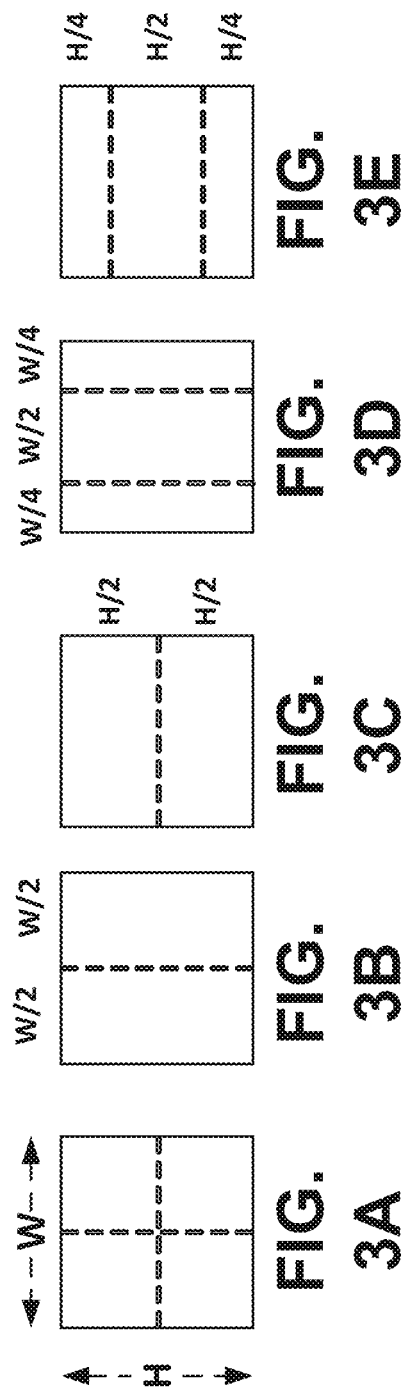

COMPLEXITY REDUCTION AND BIT-WIDTH CONTROL FOR BI-DIRECTIONAL OPTICAL FLOW

CROSS-REFERENCE TO RELATED APPLICATIONS

The present application is a continuation of U.S. patent application Ser. No. 17/276,448, filed on Mar. 15, 2021, which is a national stage application under 35 U.S.C. 371 of International Application No. PCT/US2019/051560, filed on Sep. 17, 2019, which claims benefit under 35 U.S.C. § 119(e) from U.S. Provisional Patent Application No. 62/734,763 (filed Sep. 21, 2018), U.S. Provisional Patent Application No. 62/738,655 (filed Sep. 28, 2018), and U.S. Provisional Patent Application No. 62/789,331 (filed Jan. 7, 2019), all of which are entitled "Complexity Reduction and Bit-Width Control for Bi-Directional Optical Flow," all of which are incorporated herein by reference in their entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as the MPEG1/2/4 part 2, H.264/MPEG-4 part 10 AVC, VC-1, and High Efficiency Video Coding (HEVC), which was developed by JCT-VC (Joint Collaborative Team on Video Coding) of ITU-T/SG16/Q.6/VCEG and ISO/IEC/MPEG.

The first version of the HEVC standard was finalized in October 2013, which offers approximately 50% bit-rate saving or equivalent perceptual quality compared to the prior generation video coding standard H.264/MPEG AVC. Although the HEVC standard provides significant coding improvements than its predecessor, there is evidence that superior coding efficiency can be achieved with additional coding tools over HEVC. Based on that, both VCEG and MPEG started the exploration work of new coding technologies for future video coding standardization. The Joint Video Exploration Team (JVET) was formed in October 2015 by ITU-T VECG and ISO/IEC MPEG to begin significant study of advanced technologies that could enable substantial enhancement of coding efficiency. Reference software called joint exploration model (JEM) was maintained by the JVET by integrating several additional coding tools on top of the HEVC test model (HM).

In October 2017, the joint call for proposals (CfP) on video compression with capability beyond HEVC was issued by ITU-T and ISO/IEC. In April 2018, 23 CfP responses were received and evaluated at the 10-th JVET meeting, which demonstrated compression efficiency gain over the HEVC around 40%. Based on such evaluation results, the JVET launched a new project to develop the new generation video coding standard that is named as Versatile Video Coding (VVC). In the same month, one reference software codebase, called VVC test model (VTM), was established for demonstrating a reference implementation of the VVC standard. Meanwhile, to facilitate the assessment of new coding tools, another reference software base called benchmark set (BMS) was also generated. In the BMS codebase, a list of additional coding tools which provides higher coding efficiency and moderate implementation complexity, are included on top of the VTM and used as the benchmark when evaluating similar coding technologies during the VVC standardization process. Specifically, there are 5 JEM coding tools integrated in the BMS-2.0, including 4×4 non-separable secondary transform (NSST), generalized bi-prediction (GBi), bi-directional optical flow (BIO), decoder-side motion vector refinement (DMVR) and current picture referencing (CPR).

SUMMARY

Embodiments described herein include methods that are used in video encoding and decoding (collectively "coding"). In some embodiments, a video coding method is provided, where the method comprising, for at least one current block in the video coded using bi-directional optical flow: calculating a first horizontal gradient array $$\frac{\partial I^{(0)}}{\partial x}(i, j)$$

based on a first prediction signal array $I^{(0)}(i, j)$ from a first reference picture; calculating a second horizontal gradient array $$\frac{\partial I^{(1)}}{\partial x}(i, j)$$

based on a second prediction signal array $I^{(1)}(i, j)$ from a second reference picture; calculating a reduced-bit-width horizontal intermediate parameter array $\psi_x(i, j)$ by a method comprising performing a right bit shift on a sum of (i) the first horizontal gradient array and (ii) the second horizontal gradient array; calculating at least a horizontal motion refinement $v_x$ based at least in part on the reduced-bit-width horizontal intermediate parameter array; and generating a prediction of the current block with bi-directional optical flow using at least the horizontal motion refinement $v_x$.

In some embodiments, the method further includes: calculating a signal-difference parameter array $\theta(i, j)$ by a method comprising calculating a difference between the first prediction signal array $I^{(0)}(i, j)$ and the second prediction signal array $I^{(1)}(i, j)$; and calculating a signal-horizontal-gradient correlation parameter $S_3$ by summing components of an elementwise multiplication of (i) the signal-difference parameter array $\theta(i, j)$ with (ii) the horizontal gradient intermediate parameter array $\psi_x(i, j)$; wherein calculating the horizontal motion refinement $v_x$ comprises bit-shifting the signal-horizontal-gradient correlation parameter $S_3$ to obtain the horizontal motion refinement $v_x$.

In some such embodiments, calculating the signal-difference parameter array $\theta(i, j)$ comprises performing a right bit shift on each of the first prediction signal array $I^{(0)}(i, j)$ and the second prediction signal array $I^{(1)}(i, j)$ before calculating the difference between the first prediction signal array $I^{(0)}(i, j)$ and the second prediction signal array $I^{(1)}(i, j)$.

In some embodiments, the method further includes: calculating a first vertical gradient array $$\frac{\partial I^{(0)}}{\partial y}(i, j)$$

based on a first prediction signal array $I^{(0)}(i, j)$ from a first reference picture; calculating a second vertical gradient array $$\frac{\partial I^{(1)}}{\partial y}(i, j)$$

based on a second prediction signal array $I^{(1)}(i, j)$ from a second reference picture; calculating a reduced-bit-width vertical intermediate parameter array $\psi_y(i, j)$ by a method comprising performing a right bit shift on a sum of (i) the first vertical gradient array and (ii) the second vertical gradient array; and calculating a vertical motion refinement $v_y$ based at least in part on the reduced-bit-width horizontal intermediate parameter array $\psi_x(i, j)$ and the reduced-bit-width vertical intermediate parameter array $\psi_y(i, j)$; wherein the prediction of the current block is generated using the horizontal motion refinement $v_x$ and the vertical motion refinement $v_y$.

Some such embodiments further include: calculating a cross-gradient correlation parameter $S_2$ by a method comprising summing components of an elementwise multiplication of (i) the horizontal intermediate parameter array $\psi_x(i, j)$ with (ii) the vertical intermediate parameter array $\psi_y(i, j)$; wherein calculating the vertical motion refinement $v_y$ comprises determining a product of (i) the horizontal motion refinement $v_x$ and (ii) the cross-gradient correlation parameter $S_2$.

In some such embodiments, determining the product of (i) the horizontal motion refinement $v_x$ and (ii) the cross-gradient correlation parameter $S_2$ comprises: separating the cross-gradient correlation parameter $S_2$ into a most-significant-bit, MSB, parameter portion $S_{2,m}$ and a least-significant-bit, LSB, parameter portion $S_{2,s}$; determining an MSB product of (i) the horizontal motion refinement $v_x$ and (ii) the MSB parameter portion $S_{2,m}$; determining an LSB product of (i) the horizontal motion refinement $v_x$ and (ii) the LSB parameter portion $S_{2,s}$; performing a left bit shift of the MSB product to generate a bit-shifted MSB product; and adding the LSB product and the bit-shifted MSB product.

In some embodiments, generating a prediction of the current block with bi-directional optical flow comprises: for each sample in the current block, calculating a bi-directional-optical-flow sample offset, b, based on: (i) the first horizontal gradient array, $$\frac{\partial I^{(0)}}{\partial x}(i, j),$$

(ii) the first vertical gradient array $$\frac{\partial I^{(0)}}{\partial y}(i, j),$$

(iii) the second horizontal gradient array, $$\frac{\partial I^{(1)}}{\partial x}(i, j),$$

(iv) the second vertical gradient array, $$\frac{\partial I^{(1)}}{\partial y}(i, j)$$

(v) the horizontal motion refinement, $v_x$, and (vi) the vertical motion refinement, $v_y$; and for each sample in the current block, calculating a sum of at least the first prediction signal array, $I^{(0)}(i, j)$, the second prediction signal array, $I^{(1)}(i, j)$, and the bi-directional-optical-flow sample offset, b.

In some embodiments, calculating each of the gradient arrays $$\frac{\partial I^{(0)}}{\partial x}(i, j), \frac{\partial I^{(0)}}{\partial y}(i, j), \frac{\partial I^{(1)}}{\partial x}(i, j), \frac{\partial I^{(1)}}{\partial y}(i, j)$$

comprises padding samples outside the prediction signal arrays $I^{(0)}(i, j)$, $I^{(1)}(i, j)$, with respective nearest boundary samples inside the prediction signal arrays.

In some embodiments, calculating at least some values of the signal-difference parameter array $\theta(i, j)$ comprises padding samples outside the prediction signal arrays $I^{(0)}(i, j)$, $I^{(1)}(i, j)$, with respective nearest boundary samples inside the prediction signal arrays. In some embodiments, calculating at least some values of the horizontal intermediate parameter array $\psi_x(i, j)$ comprises padding gradient values outside the horizontal gradient arrays $$\frac{\partial I^{(0)}}{\partial x}(i, j), \frac{\partial I^{(1)}}{\partial x}(i, j)$$

with respective nearest boundary samples inside the horizontal gradient arrays.

In some embodiments, calculating at least some values of the vertical intermediate parameter array $\psi_y(i, j)$ comprises padding gradient values outside the vertical gradient arrays $$\frac{\partial I^{(0)}}{\partial y}(i, j), \frac{\partial I^{(1)}}{\partial y}(i, j)$$

with respective nearest boundary samples inside the vertical gradient arrays.

In some embodiments, the signal-horizontal-gradient correlation parameter $S_3$ and the cross-gradient correlation parameter $S_2$ are calculated for each sub-block in the current block.

Embodiments described herein may be performed to generate a prediction of a video block by an encoder or by a decoder.

In some embodiments, for at least one current block in the video coded using bi-directional optical flow, a first gradient component (e.g. $\partial I^{(0)}/\partial x$ or $\partial I^{(0)}/\partial y$) is calculated based on a first prediction signal from a first reference picture. A second gradient component (e.g. $\partial I^{(1)}/\partial x$ or $\partial I^{(1)}/\partial y$) is calculated based on a second prediction signal from a second reference picture. The first and second gradient components are summed, and downward bit-shifting is performed on the resulting sum to generate a reduced-bit-width correlation parameter (e.g. $\psi_x$ or $\psi_y$). A BIO motion refinement is calculated based at least in part on the reduced-bit-width correlation parameter. The block is predicted with bi-directional optical flow using the calculated motion refinement.

In some embodiments, for at least one current block in the video coded using bi-directional optical flow, a reduced-bit-width correlation parameter (e.g. θ) is generated by subtracting a first prediction signal (e.g. $I^{(0)}$) based on a first reference picture from a second prediction signal (e.g. $I^{(1)}$) based on a second reference picture and performing downward bit-shifting of the resulting difference. A BIO motion refinement is calculated based at least in part on the reduced-bit-width correlation parameter. The block with bi-directional optical flow using the calculated motion refinement.

In some embodiments, for at least one current block in the video coded using bi-directional optical flow, a reduced-bit-width first prediction signal is generated by performing a downward bit-shifting on a first prediction (e.g. $I^{(0)}$) signal from first reference picture. A reduced-bit-width second prediction signal is generated by performing a downward bit-shifting on a second prediction signal (e.g. $I^{(1)}$) from second reference picture. A reduced-bit-width correlation parameter (e.g. θ) is generated by subtracting the reduced-bit-width first prediction signal from the reduced-bit-width second prediction signal. A BIO motion refinement is calculated based at least in part on the reduced-bit-width correlation parameter, and the block is predicted with bi-directional optical flow using the calculated motion refinement.

In some embodiments, for at least one current block in the video coded using bi-directional optical flow, a reduced-bit-width first gradient component is calculated based on a reduced-bit-width first prediction signal from a first reference picture. A reduced-bit-width second gradient component is generated based on a reduced-bit width second prediction signal from a second reference picture. The first and second reduced-bit-width gradient components are summed to generate a reduced-bit-width correlation parameter. A motion refinement is calculated based at least in part on the reduced-bit-width correlation parameter, and the block is predicted with bi-directional optical flow using the calculated motion refinement.

In some embodiments, for at least one current block in the video coded using bi-directional optical flow, first and second motion-compensated prediction signals are generated for samples in the current block, wherein the first and second motion-compensated prediction signals for samples in the current block are generated using a first interpolation filter having a first number of taps. First and second motion-compensated prediction signals are also generated for samples in an extended region around the current block, wherein the first and second motion-compensated prediction signals for samples outside the current block are generated using a second interpolation filter having a second number of taps lower than the first number of taps. Motion refinement is calculated based at least in part on the first and second motion-compensated prediction signals, and the block with bi-directional optical flow using the calculated motion refinement.

In some embodiments, for at least one current block in the video coded using bi-directional optical flow, first and second motion-compensated prediction signals are generated, wherein the first and second motion-compensated prediction signals for samples in the current block are generated using a horizontal interpolation filter having a first number of taps and a vertical interpolation filter having a second number of taps lower than the first number of taps. Motion refinement is calculated based at least in part on the first and second motion-compensated prediction signals, and the block is predicted with bi-directional optical flow using the calculated motion refinement.

In some embodiments, for at least one current block in the video coded using bi-directional optical flow, first and second motion-compensated prediction signals are generated. The first and second motion-compensated prediction signals for samples in the current block are generated using a horizontal interpolation filter having a first number of taps and a vertical interpolation filter having a second number of taps. The horizontal and vertical filters are applied in a predetermined sequence, and the filter applied earlier in the sequence has a higher number of taps than the filter applied later in the sequence. A motion refinement is calculated based at least in part on the first and second motion-compensated prediction signals, and the block is predicted with bi-directional optical flow using the calculated motion refinement.

In some embodiments, a method is provided of coding a video comprising a plurality of coding units. For a plurality of coding units in the video coded using bi-prediction, bi-directional optical flow is disabled at least for the coding units having a height no greater than a threshold height (e.g. BIO may be disabled for coding units having a height of four). Bi-prediction without bi-directional optical flow is performed for the bi-predicted coding units for which bi-directional optical flow is disabled. Bi-prediction with bi-directional optical flow is performed for the bi-predicted coding units for which bi-directional optical flow is not disabled (e.g. for at least one bi-predicted coding unit for which bi-directional optical flow is not disabled).

In some embodiments, for at least one current block in the video coded using bi-directional optical flow, first and a second motion-compensated prediction signals are generated for samples in the current block. First and second values are generated for samples in an extended region around the current block, where the extended region does not include samples that are more than one row or column away from the current block. Motion refinement is calculated based at least in part on the first and second motion-compensated prediction signals and the first and second values for samples in the extended region. The block is predicted with bi-directional optical flow using the calculated motion refinement.

In some embodiments, a method is provided of coding a video that includes a plurality of coding units. For a plurality of coding units in the video that are coded using bi-prediction, bi-directional optical flow is disabled at least for the coding units predicted using a sub-block-level inter prediction technique (such as advanced temporal motion vector prediction and affine prediction). Bi-prediction without bi-directional optical flow is performed for the bi-predicted coding units for which bi-directional optical flow is disabled. Bi-prediction with bi-directional optical flow is performed for the bi-predicted coding units for which bi-directional optical flow is not disabled (e.g. for at least one of the bi-predicted coding units for which bi-directional optical flow is not disabled).

In some embodiments, for at least one current block in the video coded using bi-directional optical flow first and second motion-compensated prediction signals are generated for samples in the current block. The first and second motion-compensated prediction signals for samples in the current block are generated using a horizontal interpolation filter having a first number of taps and a vertical interpolation filter having the first number of taps. First and second motion-compensated prediction signals are also generated for samples in an extended region around the current block, where the first and second motion-compensated prediction signals for samples outside the current block are generated using a horizontal interpolation filter having the first number of taps and a vertical interpolation filter having a second number of taps lower than the first number of taps. Motion refinement is calculated based at least in part on the first and second motion-compensated prediction signals. The block is predicted with bi-directional optical flow using the calculated motion refinement.

In additional embodiments, encoder and decoder systems are provided to perform the methods described herein. An encoder or decoder system may include a processor and a non-transitory computer-readable medium storing instructions for performing the methods described herein. Additional embodiments include a non-transitory computer-readable storage medium storing a video encoded using the methods described herein.

BRIEF DESCRIPTION OF THE DRAWINGS

FIGS. 3A-3E illustrate block partitions in a multi-type tree structure: quaternary partition (FIG. 3A); vertical binary partition (FIG. 3B); horizontal binary partition (FIG. 3C); vertical ternary partition (FIG. 3D); horizontal ternary partition (FIG. 3E).

EXAMPLE NETWORKS FOR
IMPLEMENTATION OF THE EMBODIMENTS

Figure 1A:
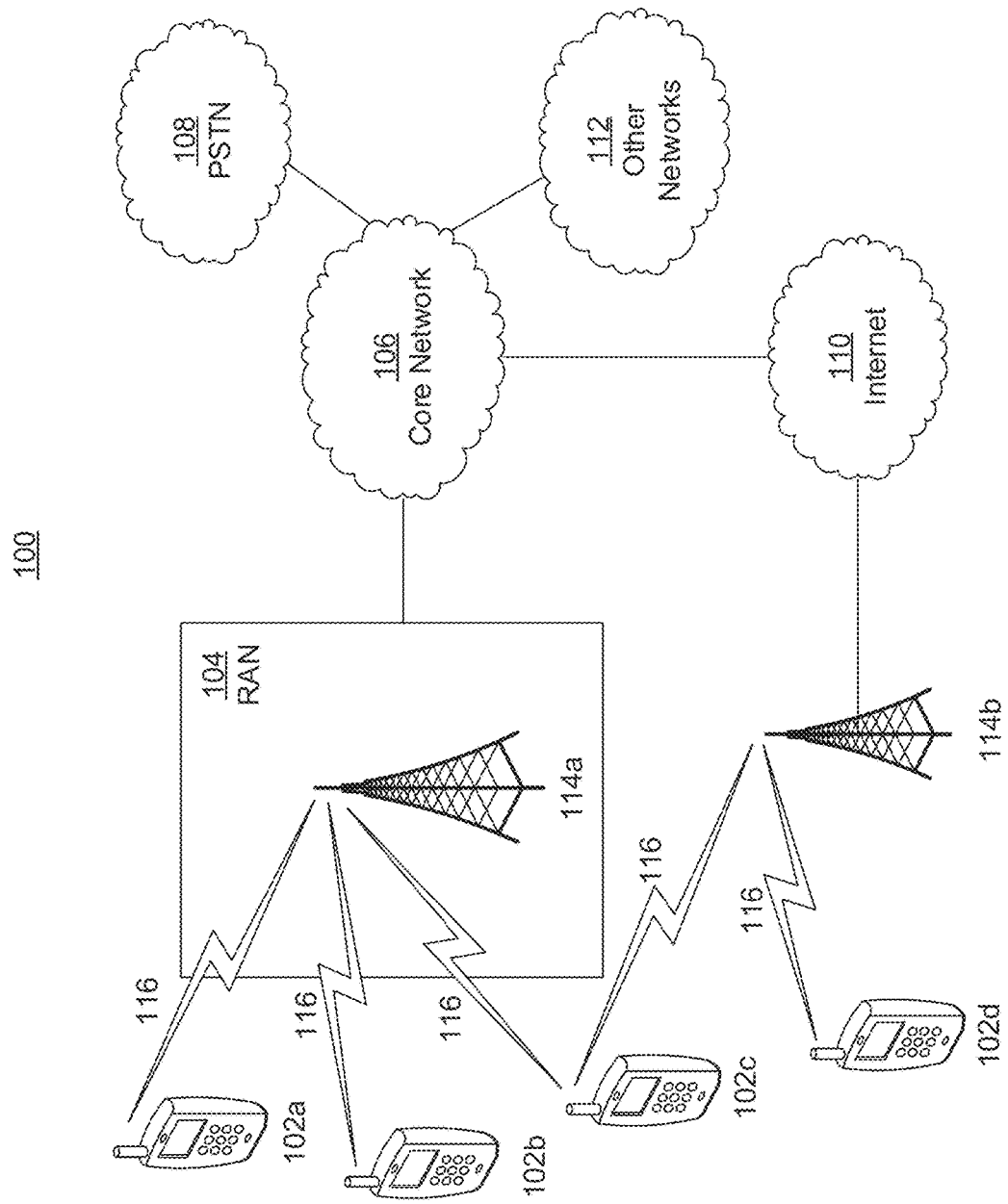
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., a eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
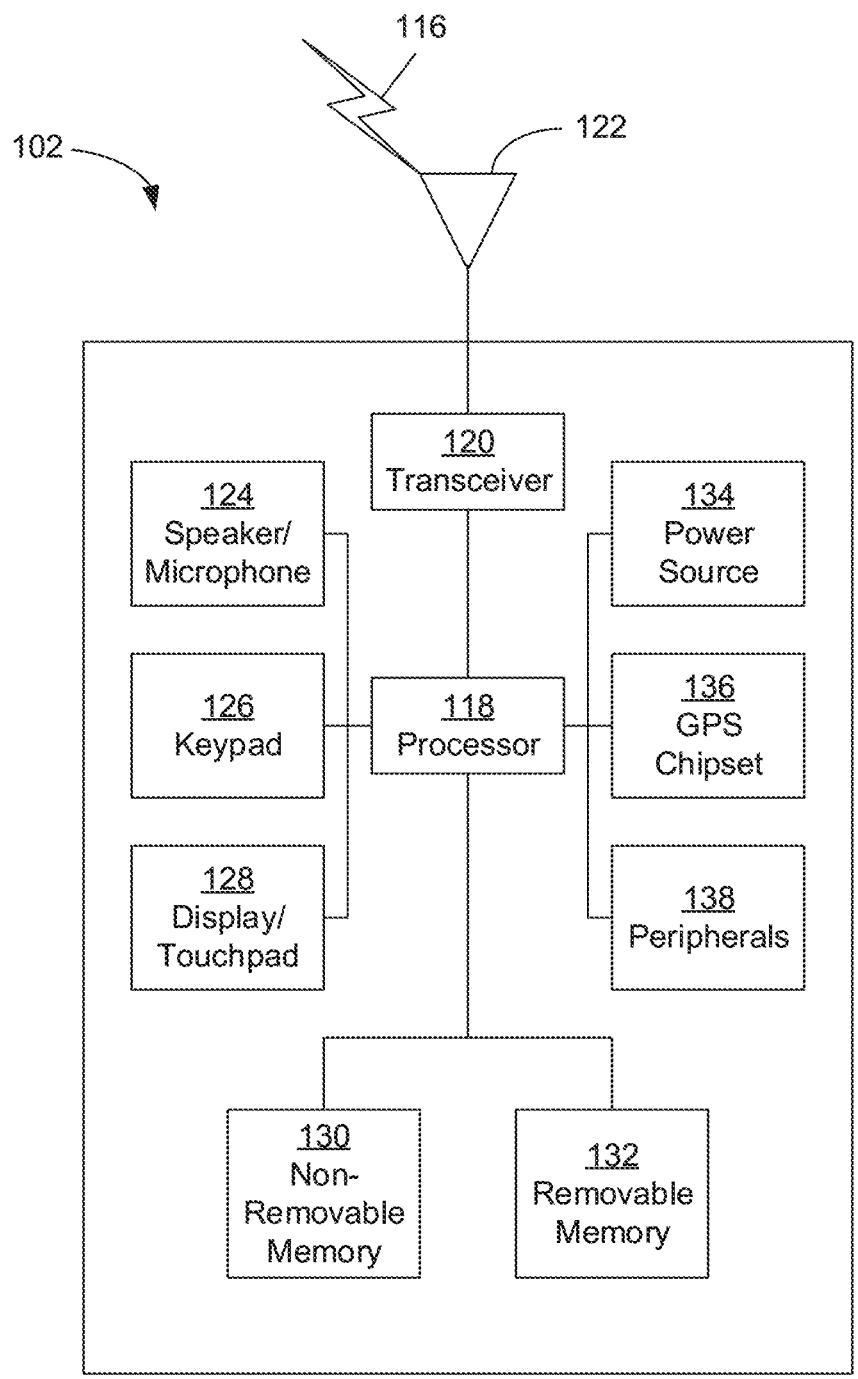
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Although the WTRU is described in FIGS. 1A-1B as a wireless terminal, it is contemplated that in certain representative embodiments that such a terminal may use (e.g., temporarily or permanently) wired communication interfaces with the communication network.

In representative embodiments, the other network 112 may be a WLAN.

In view of FIGS. 1A-1B, and the corresponding description, one or more, or all, of the functions described herein may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

DETAILED DESCRIPTION

Block-Based Video Coding.

Figure 2A:
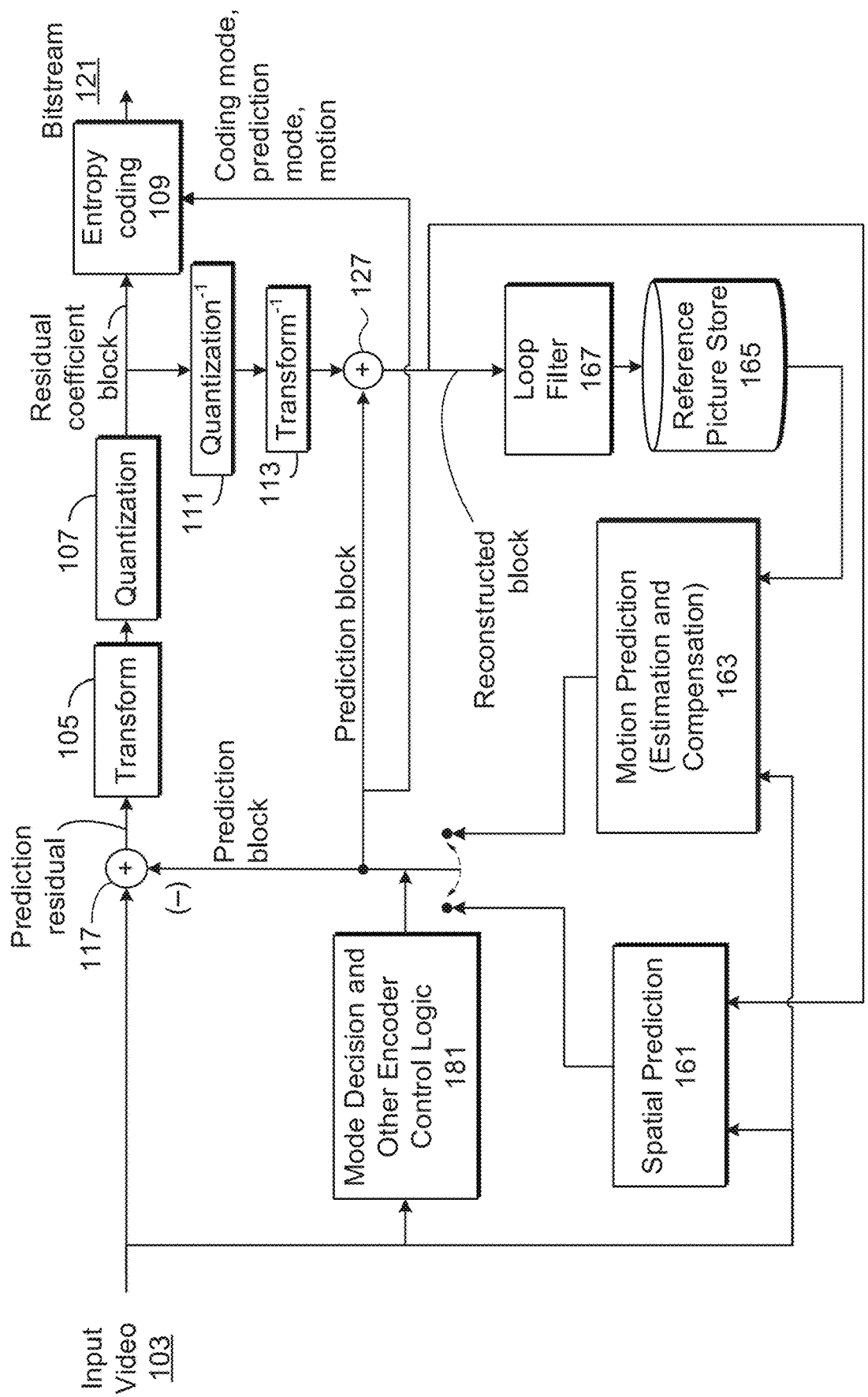
FIG. 2A is a functional block diagram of block-based video encoder, such as an encoder used for VVC.

Like HEVC, the VVC is built upon the block-based hybrid video coding framework. FIG. 2A gives the block diagram of a block-based hybrid video encoding system. The input video signal 103 is processed block by block (called coding units (CUs)). In VTM-1.0, a CU can be up to 128×128 pixels. However, different from the HEVC which partitions blocks only based on quad-trees, in the VTM-1.0, a coding tree unit (CTU) is split into CUs to adapt to varying local characteristics based on quad/binary/ternary-tree. Additionally, the concept of multiple partition unit type in the HEVC is removed, and the separation of CU, prediction unit (PU) and transform unit (TU) does not exist in the VVC anymore. Instead, each CU is always used as the basic unit for both prediction and transform without further partitions. In the multi-type tree structure, one CTU is firstly partitioned by a quad-tree structure. Then, each quad-tree leaf node can be further partitioned by a binary and ternary tree structure. As shown in FIGS. 3A-3E, there are five splitting types, quaternary partitioning, horizontal binary partitioning, vertical binary partitioning, horizontal ternary partitioning, and vertical ternary partitioning.

As illustrated in FIG. 2A, spatial prediction (161) and/or temporal prediction (163) may be performed. Spatial prediction (or "intra prediction") uses pixels from the samples of already coded neighboring blocks (which are called reference samples) in the same video picture/slice to predict the current video block. Spatial prediction reduces spatial redundancy inherent in the video signal. Temporal prediction (also referred to as "inter prediction" or "motion compensated prediction") uses reconstructed pixels from the already coded video pictures to predict the current video block. Temporal prediction reduces temporal redundancy inherent in the video signal. Temporal prediction signal for a given CU is usually signaled by one or more motion vectors (MVs) which indicate the amount and the direction of motion between the current CU and its temporal reference. Also, if multiple reference pictures are supported, a reference picture index is additionally sent, which is used to identify from which reference picture in the reference picture store (165) the temporal prediction signal comes. After spatial and/or temporal prediction, the mode decision block (181) in the encoder chooses the best prediction mode, for example based on the rate-distortion optimization method. The prediction block is then subtracted from the current video block (117); and the prediction residual is de-correlated using transform (105) and quantized (107). The quantized residual coefficients are inverse quantized (111) and inverse transformed (113) to form the reconstructed residual, which is then added back to the prediction block (127) to form the reconstructed signal of the CU. Further in-loop filtering, such as deblocking filter, sample adaptive offset (SAO) and adaptive in-loop filter (ALF) may be applied (167) on the reconstructed CU before it is put in the reference picture store (165) and used to code future video blocks. To form the output video bit-stream 121, coding mode (inter or intra), prediction mode information, motion information, and quantized residual coefficients are all sent to the entropy coding unit (109) to be further compressed and packed to form the bit-stream.

Figure 2B:
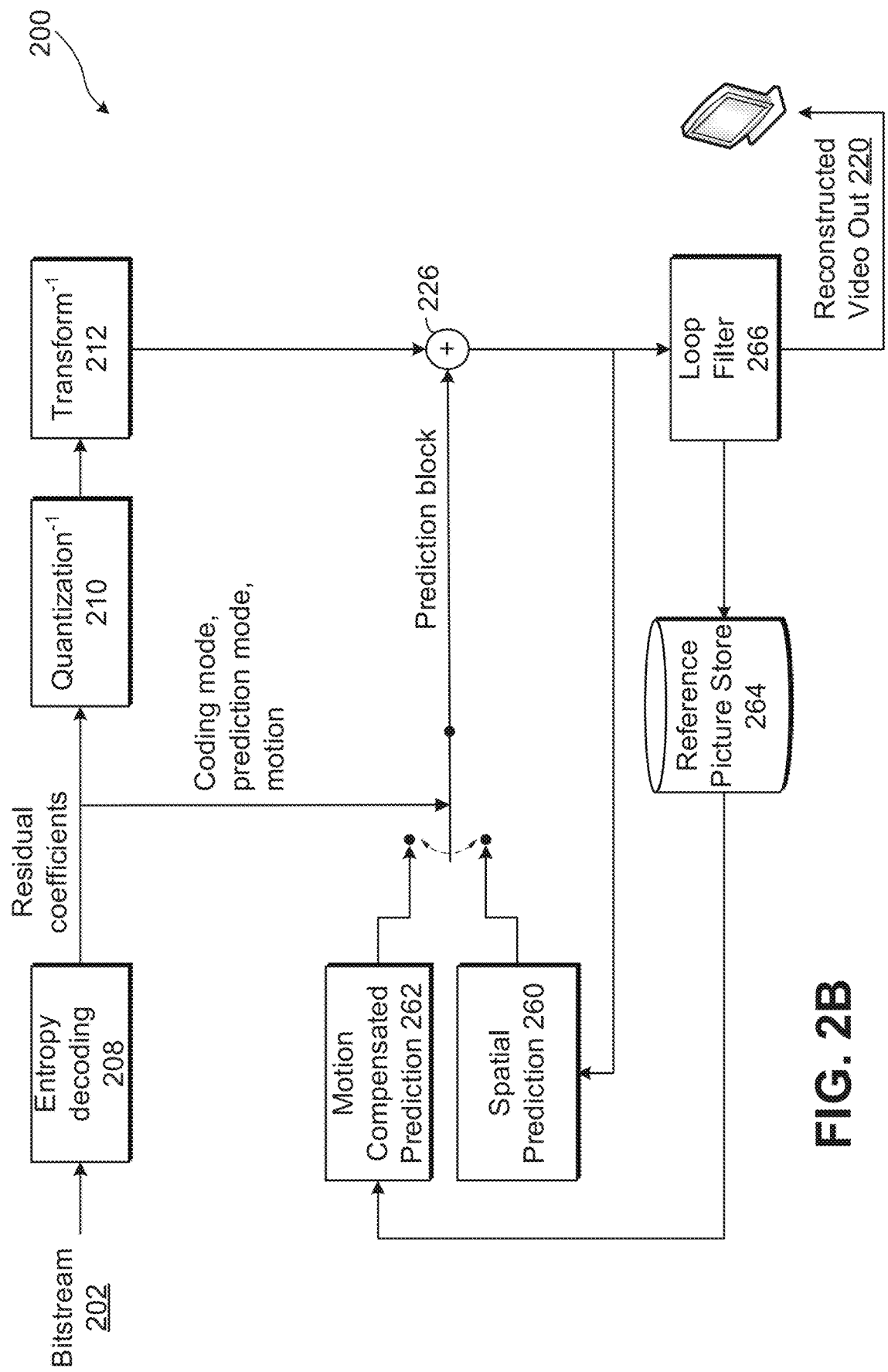
FIG. 2B is a functional block diagram of a block-based video decoder, such as a decoder used for VVC.

FIG. 2B gives a functional block diagram of a block-based video decoder. The video bit-stream 202 is first unpacked and entropy decoded at entropy decoding unit 208. The coding mode and prediction information are sent to either the spatial prediction unit 260 (if intra coded) or the temporal prediction unit 262 (if inter coded) to form the prediction block. The residual transform coefficients are sent to inverse quantization unit 210 and inverse transform unit 212 to reconstruct the residual block. The prediction block and the residual block are then added together at 226. The reconstructed block may further go through in-loop filtering before it is stored in reference picture store 264. The reconstructed video in reference picture store is then sent out to drive a display device, as well as used to predict future video blocks.

As mentioned earlier, the BMS-2.0 adheres to the same encoding/decoding workflow of the VTM-2.0 as shown in FIG. 2A and FIG. 2B. However, several coding modules, especially the ones associated with temporal prediction, are further enhanced to improve coding efficiency. This disclosure relates to reducing the computational complexity and addressing the large bit-width issue associated with the existing BIO tool in the BMS-2.0. In the following, the main design aspects of the BIO tool are introduced and then more detailed analysis is provided on the computation complexity and bit-width of the existing BIO implementation.

Bi-Predictive Prediction Based on Optical Flow Model.

Conventional bi-prediction in video coding is a simple combination of two temporal prediction blocks obtained from the reference pictures that are already reconstructed. However, due to the limitation of the block-based motion compensation (MC), there could be remaining small motion that can be observed between the samples of two prediction blocks, thus reducing the efficiency of motion compensated prediction. To solve this problem, bi-directional optical flow (BIO) is applied in the BMS-2.0 to reduce the impacts of such motion for every sample inside a block. Specifically, BIO is sample-wise motion refinement that is performed on top of the block-based motion-compensated predictions when bi-prediction is used. In the current BIO design, the derivation of the refined motion vector for each sample in one block is based on the classical optical flow model. Let $I^{(k)}(x, y)$ be the sample value at the coordinate $(x, y)$ of the prediction block derived from the reference picture list k (k=0, 1), and $\partial I^{(k)}(x, y)/\partial x$ and $\partial I^{(k)}(x, y)/\partial y$ are the horizontal and vertical gradients of the sample. Given the optical flow model, the motion refinement $(v_x, v_y)$ at $(x, y)$ can be derived by $$\frac{\partial I^{(k)}(x, y)}{\partial t} + v_x \cdot \frac{\partial I^{(k)}(x, y)}{\partial x} + v_y \cdot \frac{\partial I^{(k)}(x, y)}{\partial y} = 0 \quad (1)$$

Figure 4:
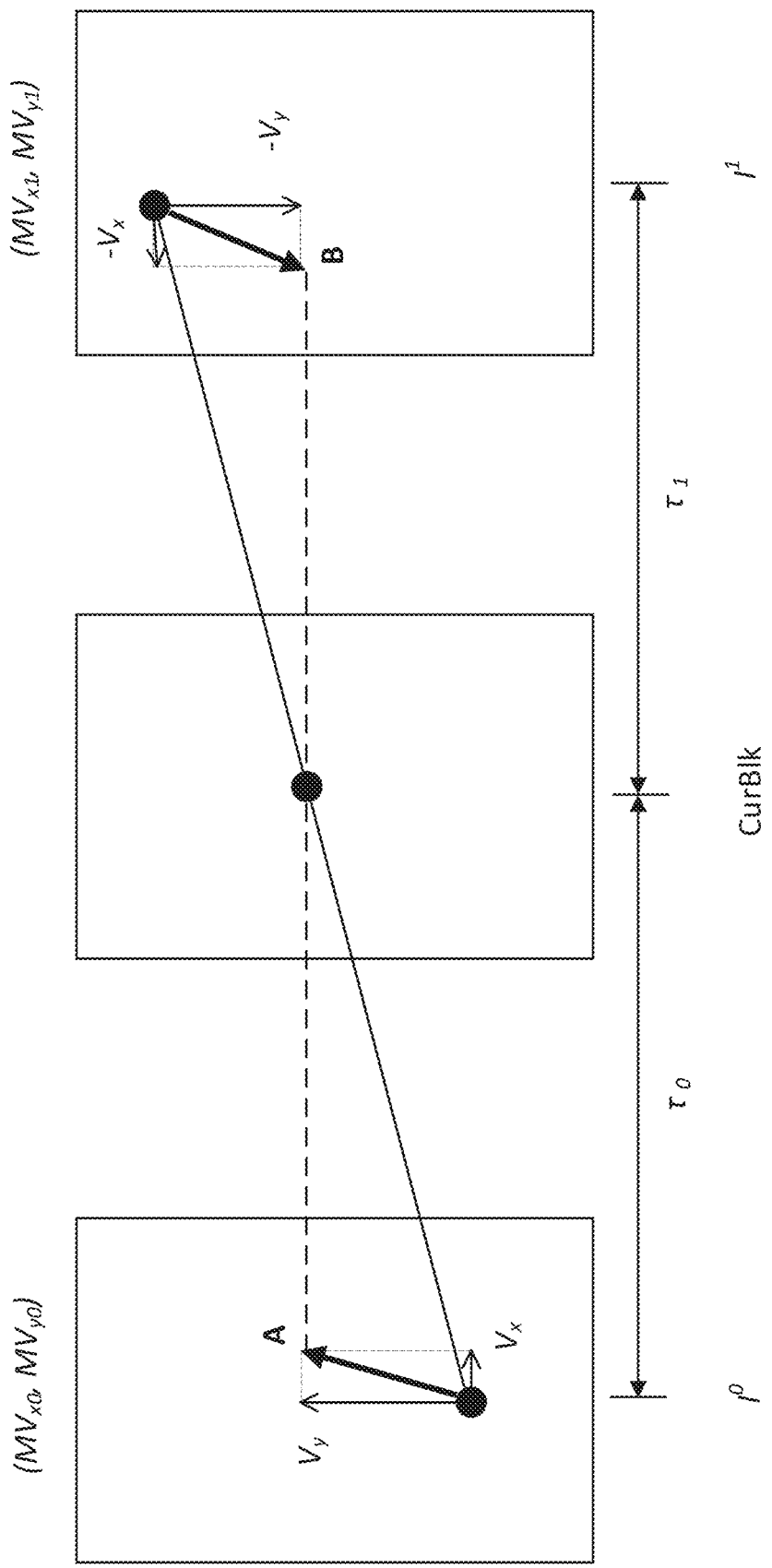
FIG. 4 is a schematic illustration of prediction using bidirectional optical flow (BIO).

In FIG. 4, $(MV_{x0}, MV_{y0})$ and $(MV_{x1}, MV_{y1})$ indicate the block-level motion vectors that are used to generate the two prediction blocks $I^{(0)}$ and $I^{(1)}$. Further, the motion refinement $(v_x, v_y)$ at the sample location $(x, y)$ is calculated by minimizing the difference $\Delta$ between the values of the samples after motion refinement compensation (A and B in FIG. 4), as shown as $$\Delta(x, y) = I^{(0)}(x, y) - I^{(1)}(x, y) + \quad (2)$$
$$v_x\left(\frac{\partial I^{(1)}(x, y)}{\partial x} + \frac{\partial I^{(0)}(x, y)}{\partial x}\right) + v_y\left(\frac{\partial I^{(1)}(x, y)}{\partial y} + \frac{\partial I^{(0)}(x, y)}{\partial y}\right)$$

Additionally, to ensure the regularity of the derived motion refinement, it is assumed that the motion refinement is consistent for the samples inside one small unit (i.e., 4×4 block). In the BMS-2.0, the value of $(v_x, v_y)$ are derived by minimizing $\Delta$ inside the 6×6 window $\Omega$ around each 4×4 block as $$(v_x^*, v_y^*) = \underset{(v_x,v_y)}{\operatorname{argmin}} \sum_{(i,j)\in\Omega} \Delta^2(i, j) \quad (3)$$

To solve the optimization problem specified in (3), BIO uses a progressive method which firstly optimizes the motion refinement in the horizontal direction and then in the vertical direction. This results in $$v_x=(S_1+r)>m? \operatorname{clip3}(-th_{BIO}, th_{BIO}, -(S_3>>\lfloor\log_2(S_1+r)\rfloor)): 0$$

$$v_y=(S_5+r)>m? \operatorname{clip3}(-th_{BIO}, th_{BIO}, -((S_6-v_xS_2)>>\lfloor\log_2(S_5+r)\rfloor)): 0 \quad (4)$$

where $\lfloor \cdot \rfloor$ is the floor function which outputs the greatest value that is less than or equal to the input and $th_{BIO}$ is the motion refinement threshold to prevent the error propagation due to coding noise and irregular local motion, which is equal to $2^{18-BD}$. The operator (? :) is the ternary conditional operator; an expression of the form (a ? b : c) evaluates to b if the value of a is true, otherwise it evaluates to c. The function clip3(a, b, c) returns a if c<a, returns c if a≤c≤b, and returns b if b<c. The values of $S_1$, $S_2$, $S_3$, $S_5$ and $S_6$ are further calculated as $$S_1 = \Sigma_{(i,j)\in\Omega}\psi_x(i, j)\cdot\psi_x(i, j), \quad (5)$$
$$S_3 = \Sigma_{(i,j)\in\Omega}\theta(i, j)\cdot\psi_x(i, j)\cdot 2^L$$
$$S_2 = \sum_{(i,j)\in\Omega}\psi_x(i, j)\cdot\psi_y(i, j)$$
$$S_5 = \Sigma_{(i,j)\in\Omega}\psi_y(i, j)\cdot\psi_y(i, j)\cdot 2$$
$$S_6 = \Sigma_{(i,j)\in\Omega}\theta(i, j)\cdot\psi_y(i, j)\cdot 2^{L+1}$$

where $$\psi_x(i, j) = \frac{\partial I^{(1)}}{\partial x}(i, j) + \frac{\partial I^{(0)}}{\partial x}(i, j) \quad (6)$$
$$\psi_y(i, j) = \frac{\partial I^{(1)}}{\partial y}(i, j) + \frac{\partial I^{(0)}}{\partial y}(i, j)$$
$$\theta(i, j) = I^{(1)}(i, j) - I^{(0)}(i, j)$$

In the BMS-2.0, the BIO gradients in (6) in both horizontal and vertical directions are directly obtained by calculating the difference between two neighboring samples (horizontally or vertically depending on the direction of the gradient being derived) at one sample position of each L0/L1 prediction block, e.g.

$$\frac{\partial I^{(k)}}{\partial x}(i, j) = (I^{(k)}(i+1, j) - I^{(k)}(i-1, j)) \gg 4 \quad (7)$$
$$\frac{\partial I^{(k)}}{\partial y}(i, j) = (I^{(k)}(i, j+1) - I^{(k)}(i, j-1)) \gg 4$$
$$k = 0,1$$

In (5), L is the bit-depth increase for the internal BIO process to keep data precision, which is set to 5 in the BMS-2.0. Additionally, to avoid division by a smaller value, the regulation parameters r and m in (4) are defined as $$r=500\cdot 4^{BD-8}$$

$$m=700\cdot 4^{BD-8} \quad (8)$$

where BD is the bit depth of the input video. Based on the motion refinement derived by (4), the final bi-prediction signal of the current CU can be calculated by interpolating the L0/L1 prediction samples along the motion trajectory based on the optical flow equation (1), as specified as $$pred_{BIO}(x, y) = (I^{(0)}(x, y) + I^{(1)}(x, y) + b + o_{offset}) \gg \text{shift}$$
$$b = rnd\left(\left(v_x\left(\frac{\partial I^{(1)}(x, y)}{\partial x} - \frac{\partial I^{(0)}(x, y)}{\partial x}\right)\right)/2^{L+1}\right) +$$
$$rnd\left(\left(v_y\left(\frac{\partial I^{(1)}(x, y)}{\partial y} - \frac{\partial I^{(0)}(x, y)}{\partial y}\right)\right)/2^{L+1}\right)$$

where b is a bi-directional-optical-flow sample offset; shift is a right shift that is applied to combine the L0 and L1 prediction signals for bi-prediction, which may be set equal to 15−BD; $o_{offset}$ is a bit-depth offset that may be set to 1<<(14−BD)+2·(1<<13); and rnd(.) is rounding function which round the input value to the closest integer value.

Bit-Width Analysis of BIO.

Like its preceding standard HEVC, for bi-predicted CUs in VVC, if the MVs point to fractional sample positions, the L0/L1 prediction signals, i.e., $I^{(0)}(x, y)$ and $I^{(1)}(x, y)$, are generated at intermediate high precision (i.e., 16 bit) to keep the precision of the following averaging operation. Additionally, in case any of the two MVs is an integer, the precision of the corresponding prediction samples (which are directly fetched from the reference picture) are increased to the intermediate precision before the averaging is applied. Given the bi-prediction signals at intermediate bit-depth, assuming the input video is 10-bit, Table 1 summarizes the bit-widths of the intermediate parameters that are needed at each stage of the BIO process as illustrated in the section "Bi-predictive prediction based on optical flow model".

TABLE 1

The bit-widths of intermediate parameters of the BIO design in BMS-2.0 (10-bit input video)

| Operation | Parameter | Bit-width |
|---|---|---|
| L0/L1 prediction | $I^{(0)}(i, j), I^{(1)}(i, j)$ | 16 |
| Gradient derivation | $\frac{\partial I^{(0)}}{\partial x}(i, j), \frac{\partial I^{(0)}}{\partial y}(i, j)$ | 13 |
| | $\frac{\partial I^{(1)}}{\partial x}(i, j), \frac{\partial I^{(1)}}{\partial y}(i, j)$ | 13 |
| Correlation parameter calculation | $\theta(i, j) = I^{(1)}(i, j) - I^{(0)}(i, j)$ | 17 |
| | $\psi_x(i, j) = \frac{\partial I^{(1)}}{\partial x}(i, j) + \frac{\partial I^{(0)}}{\partial x}(i, j)$ | 14 |
| | $\psi_y(i, j) = \frac{\partial I^{(1)}}{\partial y}(i, j) + \frac{\partial I^{(0)}}{\partial y}(i, j)$ | 14 |
| | $\psi_x(i, j) \cdot \psi_x(i, j)$ | 27 |
| | $\psi_x(i, j) \cdot \psi_y(i, j)$ | 27 |
| | $\theta(i, j) \cdot \psi_x(i, j) \cdot 2^5$ | 35 |
| | $\psi_y(i, j) \cdot \psi_y(i, j) \cdot 2$ | 28 |
| | $\theta(i, j) \cdot \psi_y(i, j) \cdot 2^6$ | 36 |
| Summation | $S_1 = \sum_{(i,j)\in\Omega} \psi_x(i, j) \cdot \psi_x(i, j)$ | 33 |
| | $S_2 = \sum_{(i,j)\in\Omega} \psi_x(i, j) \cdot \psi_y(i, j)$ | 33 |
| | $S_3 = \sum_{(i,j)\in\Omega} \theta(i, j) \cdot \psi_x(i, j) \cdot 2^5$ | 41 |
| | $S_5 = \sum_{(i,j)\in\Omega} \psi_y(i, j) \cdot \psi_y(i, j) \cdot 2$ | 34 |
| | $S_6 = \sum_{(i,j)\in\Omega} \theta(i, j) \cdot \psi_y(i, j) \cdot 2^6$ | 42 |
| Motion refinement derivation | $v_x = (S_1 + r)$ >m? clip3 ($-th_{BIO}, th_{BIO}, -(S_3 >> \lfloor\log_2(S_1 + r)\rfloor)$):0 | 9 |
| | $S_6 - v_x S_2$ | 43 |
| | $v_y = (S_5 + r)$ >m? clip3 ($-th_{BIO}, th_{BIO}, -((S_6 - v_x S_2/2) >> \lfloor\log_2(S_5 + r)\rfloor)$):0 | 9 |
| Final bi-prediction generation | $v_x \cdot \left(\frac{\partial I^{(1)}}{\partial x}(i, j) - \frac{\partial I^{(0)}}{\partial x}(i, j)\right)$ | 22 |
| | $v_y \cdot \left(\frac{\partial I^{(1)}}{\partial y}(i, j) - \frac{\partial I^{(0)}}{\partial y}(i, j)\right)$ | 22 |

As can be seen from Table 1, the extreme bit-width of the entire BIO process happens at the calculation of the vertical motion refinement $v_y$ in (4) where $S_6$ (42-bit) is subtracted by the multiplicative product of $v_x$ (9-bit) and $S_2$ (33-bit). Therefore, the maximum bit-width of the existing BIO design is equal to 42+1=43 bit. Additionally, as the multiplication (i.e., $v_x S_2$) takes $S_2$ as input, a 33-bit multiplier is used to calculate the value of $v_y$. Therefore, a straightforward implementation of the current BIO in the BMS-2.0 could call for 33-bit multiplier and has the maximal bit-width of 43-bit for intermediate parameters.

Computational Complexity Analysis of BIO.

In this section, a computational complexity analysis is performed for the existing BIO design. Specifically, the number of operations (e.g., multiplications and additions) that are used to generate the final motion compensated prediction with the BIO being applied are computed, according to the current BIO implementation in the BMS-2.0. Additionally, to facilitate the following discussion, it is assumed the size of the current CU that is predicted by the BIO is equal to W×H where W is the width and H is the height of the CU.

The Generation of the L0 and L1 Prediction Samples.

As shown in (3), to derive the local motion refinement ($v_x$, $v_y$) for each 4×4 block, both the sample values and the gradient values need are calculated for all the samples in a 6×6 surrounding window around the sample. Therefore, to derive the local motion refinements ($v_x$, $v_y$) for all the samples within the CU, the gradients of (W+2)×(H+2) samples are used by the BIO. Additionally, as indicated in (7), both the horizontal and vertical gradients are obtained by directly calculating the difference between two neighboring samples. Therefore, to calculate (W+2)×(H+2) gradient values, the total number of prediction samples in both L0 and L1 prediction directions is equal to (W+4)×(H+4). As the current motion compensation is based on 2D separable finite impulse response (FIR) 8-tap filters, both the number of multiplications and additions that are used to generate L0 and L1 prediction samples are equal to ((W+4)×(H+4+7)×8+(W+4)×(H+4)×8)×2.

Gradient Calculation.

As shown in (7), because the gradients are directly calculated from two neighboring prediction samples, only one addition is needed per sample. Considering both horizontal and vertical gradients are derived in an extended region for (W+2)×(H+2) both L0 and L1, the total number of additions that are required for the gradient derivation is equal to ((W+2)×(H+2))×2×2.

Correlation Parameter Calculation.

As shown in Eqs. (5) and (6), there are five correlation parameters (i.e., $S_1$, $S_2$, $S_3$, $S_5$ and $S_6$) that are calculated for all the samples in the extended region (W+2)×(H+2) by the BIO. Additionally, there are five multiplications and three additions used to calculate the five parameters at each sample position. Therefore, the total number of multiplications and additions for calculating the correlation parameters are equal to ((W+2)×(H+2))×5 and ((W+2)×(H+2))×3, respectively.

Summation.

As described above, the BIO motion refinements ($v_x$, $v_y$) are separately derived for each 4×4 block within the current CU. To derive the motion refinement of each 4×4 block, the sums of the five correlation parameters inside the 6×6 surrounding area are calculated. Therefore, at this stage, the summation of the five correlation parameters uses in total (W/4)×(H/4)×6×6×5 additions.

Motion Refinement Derivation.

As shown in (4), to derive the local motion refinement ($v_x$, $v_y$) for each 4×4 block, there are two additions for adding the regulation parameter r to $S_1$ and $S_3$. Additionally, there are one multiplication and addition to calculate the value of $v_y$. So, to derive the motion refinements for all 4×4 blocks inside the CU, the numbers of multiplications and additions that are used are equal to (W/4)×(H/4) and (W/4)×(H/4)×3, respectively.

Generation of the Bi-Prediction Signal.

As shown in (9), given the derived motion refinements, two multiplications and six additions are further used to derive the final predication sample value at each sample position. Therefore, at this stage, there are in total W×H×2 multiplications and W×H×6 additions that are performed.

Issues Addressed in Some Embodiments.

As described above, BIO can enhance the efficiency of bi-predictive prediction by improving both the granularity and the accuracy of the motion vectors that are used at the motion compensation stage. Although BIO can efficiently improve the coding performance, it introduces significant complexity increases to practical hardware implementations. In this disclosure, the following complexity issues that exist in the current BIO design in the BMS-2.0 are identified.

High Intermediate Bit-Width and Large Multiplier for BIO.

Like the HEVC standard, 2D separable FIR filters are applied at the motion compensation stage to interpolate the prediction samples of a prediction block when its MVs point to fractional sample positions in the reference picture. Specifically, one interpolation filter is first applied in the horizontal direction to derive the intermediate samples according to the horizontal fractional component of the MV; then, another interpolation filter is applied vertically on top of the above horizontal fractional samples according to the vertical fractional component of the MV. Assuming the input is 10-bit video (i.e., BD=10), Table 2 provides a bit-width measurement for motion compensated prediction process in the VTM/BMS-2.0 by assuming the both the horizontal and vertical MVs point to half-sample positions which corresponds to the worst-case bit-width of the interpolated sample from the motion compensation process. Specifically, at the first step, the worst-case bit-width of the intermediate data after the first interpolation process (horizontal interpolation) is calculated by setting the values of the input reference samples associated with positive and negative filter coefficients to the maximum input value (i.e., $2^{BD}-1$) and the minimum input value (i.e., 0), respectively. Then, the worst-case bit-width of the second interpolation process (vertical interpolation) is obtained by setting the values of the input data for the second interpolation to the worst possible value output from the first interpolation.

TABLE 2

The bit-widths of intermediate data for motion compensation interpolation

| Operation | Bit-width after each operation |
|---|---|
| Input | 10 |
| Horizontal interpolation | 17 |
| $1^{st}$ right shift of (BD-8)-bit | 15 |
| Vertical interpolation | 22 |
| $2^{nd}$ right shift of 6-bit | 16 |

As can be seen from Table 2, the maximum bit-width for the motion compensation interpolation exists at the vertical interpolation process where the input data is 15-bit and the filter coefficients are 7-bit signed values; therefore, the bit-width of the output data from the vertical interpolation is 22 bit. Additionally, given the input data to the vertical interpolation process is 15-bit, a 15-bit multiplier is sufficient for the generation of intermediate fractional sample values at the motion compensation stage.

However, as analyzed above, the existing BIO design calls for a 33-bit multiplier and has 43-bit intermediate parameters to maintain the precision of intermediate data. Compared to Table 2, both numbers are much higher than those of the regular motion compensation interpolation. In practice, such a significant bit-width increase (especially the bit-width increase of the required multiplier) could be very expensive for both hardware and software, therefore increasing the implementation cost of the BIO.

High Computational Complexity of BIO.

Based on the complexity analysis above, Table 3 and Table 4 depict the numbers of multiplications and additions that needed to be performed per sample for different CU sizes according to the current BIO, and compares them to the complexity statistics of regular 4×4 bi-predicted CU which corresponds to the worst-case computational complexity in the VTM/BMS-2.0. For 4×4 bi-predicted CU, given that the length of the interpolation filters (e.g., 8), the total numbers of multiplications and additions are equal to (4×(4+7)×8+ 4×4×8)×2=960 (i.e., 60 per sample) and (4×(4+7)×8+4×4× 8)×2+4×4×2=992 (i.e., 62 per sample).

TABLE 3

The number of multiplications performed per sample by the BIO in the BMS-2.0. The last column shows the percentage of BIO multiplication relative to that of 4 × 4 bi-pred motion compensation

| | | BIO | | | | | | |
|---|---|---|---|---|---|---|---|---|
| CU size (W × H) | L0/L1 Pred | Gradient | Correlation | Summation | Motion refinement | Final bi-prediction | Total | Percentage |
| 4 × 4 | 184.0 | 0 | 11.3 | 0 | 0.1 | 2 | 197.3 | 329% |
| 4 × 8 | 124.0 | 0 | 9.4 | 0 | 0.1 | 2 | 135.4 | 226% |
| 8 × 4 | 138.0 | 0 | 9.4 | 0 | 0.1 | 2 | 149.4 | 249% |
| 4 × 16 | 94.0 | 0 | 8.4 | 0 | 0.1 | 2 | 104.5 | 174% |
| 16 × 4 | 115.0 | 0 | 8.4 | 0 | 0.1 | 2 | 125.5 | 209% |
| 4 × 32 | 79.0 | 0 | 8.0 | 0 | 0.1 | 2 | 89.0 | 148% |
| 32 × 4 | 103.5 | 0 | 8.0 | 0 | 0.1 | 2 | 113.5 | 189% |
| 4 × 64 | 71.5 | 0 | 7.7 | 0 | 0.1 | 2 | 81.3 | 135% |
| 64 × 4 | 97.8 | 0 | 7.7 | 0 | 0.1 | 2 | 107.5 | 179% |
| 4 × 128 | 67.8 | 0 | 7.6 | 0 | 0.1 | 2 | 77.4 | 129% |
| 128 × 4 | 94.9 | 0 | 7.6 | 0 | 0.1 | 2 | 104.6 | 174% |
| 8 × 8 | 93.0 | 0 | 7.8 | 0 | 0.1 | 2 | 102.9 | 171% |
| 8 × 16 | 70.5 | 0 | 7.0 | 0 | 0.1 | 2 | 79.6 | 133% |
| 16 × 8 | 77.5 | 0 | 7.0 | 0 | 0.1 | 2 | 86.6 | 144% |
| 8 × 32 | 59.3 | 0 | 6.6 | 0 | 0.1 | 2 | 68.0 | 113% |
| 32 × 8 | 69.8 | 0 | 6.6 | 0 | 0.1 | 2 | 78.5 | 131% |
| 8 × 64 | 53.6 | 0 | 6.4 | 0 | 0.1 | 2 | 62.1 | 104% |
| 64 × 8 | 65.9 | 0 | 6.4 | 0 | 0.1 | 2 | 74.4 | 124% |
| 8 × 128 | 50.8 | 0 | 6.3 | 0 | 0.1 | 2 | 59.2 | 99% |
| 128 × 8 | 63.9 | 0 | 6.3 | 0 | 0.1 | 2 | 72.3 | 121% |

TABLE 3-continued

The number of multiplications performed per sample by the BIO in the BMS-2.0. The last column shows the percentage of BIO multiplication relative to that of 4 × 4 bi-pred motion compensation

| | | BIO | | | | | | |
|---|---|---|---|---|---|---|---|---|
| CU size (W × H) | L0/L1 Pred | Gradient | Correlation | Summation | Motion refinement | Final bi-prediction | Total | Percentage |
| 16 × 16 | 58.8 | 0 | 6.3 | 0 | 0.1 | 2 | 67.1 | 112% |
| 16 × 32 | 49.4 | 0 | 6.0 | 0 | 0.1 | 2 | 57.4 | 96% |
| 32 × 16 | 52.9 | 0 | 6.0 | 0 | 0.1 | 2 | 60.9 | 102% |
| 16 × 64 | 44.7 | 0 | 5.8 | 0 | 0.1 | 2 | 52.6 | 88% |
| 64 × 16 | 49.9 | 0 | 5.8 | 0 | 0.1 | 2 | 57.8 | 96% |
| 16 × 128 | 42.3 | 0 | 5.7 | 0 | 0.1 | 2 | 50.1 | 84% |
| 128 × 16 | 48.5 | 0 | 5.7 | 0 | 0.1 | 2 | 56.2 | 94% |

TABLE 4

The number of additions performed per sample by the BIO in the BMS-2.0. The last column shows the percentage of BIO addition relative to that of 4 × 4 bi-pred motion compensation

| | | BIO | | | | | | |
|---|---|---|---|---|---|---|---|---|
| CU size (W × H) | L0/L1 Pred | Gradient | Correlation | Summation | Motion refinement | Final bi-prediction | Total | Percentage |
| 4 × 4 | 184.0 | 9.0 | 6.8 | 11.3 | 0.2 | 6 | 217.2 | 350% |
| 4 × 8 | 124.0 | 7.5 | 5.6 | 11.3 | 0.2 | 6 | 154.6 | 249% |
| 8 × 4 | 138.0 | 7.5 | 5.6 | 11.3 | 0.2 | 6 | 168.6 | 272% |
| 4 × 16 | 94.0 | 6.8 | 5.1 | 11.3 | 0.2 | 6 | 123.3 | 199% |
| 16 × 4 | 115.0 | 6.8 | 5.1 | 11.3 | 0.2 | 6 | 144.3 | 233% |
| 4 × 32 | 79.0 | 6.4 | 4.8 | 11.3 | 0.2 | 6 | 107.6 | 174% |
| 32 × 4 | 103.5 | 6.4 | 4.8 | 11.3 | 0.2 | 6 | 132.1 | 213% |
| 4 × 64 | 71.5 | 6.2 | 4.6 | 11.3 | 0.2 | 6 | 99.8 | 161% |
| 64 × 4 | 97.8 | 6.2 | 4.6 | 11.3 | 0.2 | 6 | 126.0 | 203% |
| 4 × 128 | 67.8 | 6.1 | 4.6 | 11.3 | 0.2 | 6 | 95.9 | 155% |
| 128 × 4 | 94.9 | 6.1 | 4.6 | 11.3 | 0.2 | 6 | 123.0 | 198% |
| 8 × 8 | 93.0 | 6.3 | 4.7 | 11.3 | 0.2 | 6 | 121.4 | 196% |
| 8 × 16 | 70.5 | 5.6 | 4.2 | 11.3 | 0.2 | 6 | 97.8 | 158% |
| 16 × 8 | 77.5 | 5.6 | 4.2 | 11.3 | 0.2 | 6 | 104.8 | 169% |
| 8 × 32 | 59.3 | 5.3 | 4.0 | 11.3 | 0.2 | 6 | 86.0 | 139% |
| 32 × 8 | 69.8 | 5.3 | 4.0 | 11.3 | 0.2 | 6 | 96.5 | 156% |
| 8 × 64 | 53.6 | 5.2 | 3.9 | 11.3 | 0.2 | 6 | 80.1 | 129% |
| 64 × 8 | 65.9 | 5.2 | 3.9 | 11.3 | 0.2 | 6 | 92.3 | 149% |
| 8 × 128 | 50.8 | 5.1 | 3.8 | 11.3 | 0.2 | 6 | 77.1 | 124% |
| 128 × 8 | 63.9 | 5.1 | 3.8 | 11.3 | 0.2 | 6 | 90.3 | 146% |
| 16 × 16 | 58.8 | 5.1 | 3.8 | 11.3 | 0.2 | 6 | 85.0 | 137% |
| 16 × 32 | 49.4 | 4.8 | 3.6 | 11.3 | 0.2 | 6 | 75.2 | 121% |
| 32 × 16 | 52.9 | 4.8 | 3.6 | 11.3 | 0.2 | 6 | 78.7 | 127% |
| 16 × 64 | 44.7 | 4.6 | 3.5 | 11.3 | 0.2 | 6 | 70.2 | 113% |
| 64 × 16 | 49.9 | 4.6 | 3.5 | 11.3 | 0.2 | 6 | 75.5 | 122% |
| 16 × 128 | 42.3 | 4.6 | 3.4 | 11.3 | 0.2 | 6 | 67.8 | 109% |
| 128 × 16 | 48.5 | 4.6 | 3.4 | 11.3 | 0.2 | 6 | 73.9 | 119% |

As shown in Table 3 and Table 4, the computational complexity shows a significant increase by enabling the existing BIO in the BMS-2.0, compared to the worst-case complexity of regular bi-prediction. The peak complexity increase comes from 4×4 bi-predicted CUs, where the numbers of multiplications and additions with the BIO being enabled are 329% and 350% of that of worst-case bi-prediction.

Overview of Example Embodiments

To address at least some of the issues described above, methods are proposed in this section to reduce the complexity of motion compensated prediction based on the BIO while maintaining its coding gain. Firstly, to reduce the implementation cost, bit-width control methods are proposed in this disclosure to reduce the internal bit-width that is used for hardware BIO implementation. In some proposed methods, the motion compensated prediction with BIO enabled can be implemented with a 15-bit multiplier and the intermediate values within 32-bit.

Secondly, methods are proposed to reduce the computational complexity of the BIO by using simplified filters and reducing the number of extended prediction samples that are used for the BIO motion refinement.

Additionally, it is proposed in some embodiments to disable the BIO operation for the CU sizes which lead to significant computational complexity increase compared to regular bi-prediction. Based on the combination of those complexity reductions, the worst-case computational complexity (e.g., the number of multiplications and additions) of the motion compensated prediction when the BIO is enabled can be reduced to be approximately at the same level as the worst-case complexity of the regular bi-prediction.

Example BIO Bit-Width Control Methods.

As pointed out above, the implementation of the current BIO in the BMS-2.0 uses 33-bit multiplier and 43-bit bit-width for intermediate parameters, which are much higher than that of the motion compensation interpolation of the HEVC. This makes it very costly to implement the BIO for hardware and software. In this section, bit-width control methods are proposed to reduce the bit-width that is required for the BIO. In example methods, one or more of the horizontal intermediate parameter array $\psi_x(i, j)$, the vertical intermediate parameter array $\psi_y(i, j)$ and the signal-difference parameter array $\theta(i, j)$ in (6) are firstly shifted down by $n_a$ and $n_b$ bits, respectively, to reduce the overall bit-width of intermediate parameters, as depicted as:

$$\psi_x(i, j) = \left(\frac{\partial I^{(1)}}{\partial x}(i, j) + \frac{\partial I^{(0)}}{\partial x}(i, j)\right) \gg n_a \quad (10)$$

$$\psi_y(i, j) = \left(\frac{\partial I^{(1)}}{\partial y}(i, j) + \frac{\partial I^{(0)}}{\partial y}(i, j)\right) \gg n_a$$

$$\theta(i, j) = \left(I^{(1)}(i, j) - I^{(0)}(i, j)\right) \gg n_b$$

Moreover, to further lower the bit-width, the original L-bit internal bit-depth increase may be removed. With such change, the equations in (5) for calculating the horizontal-gradient correlation parameter ($S_1$), the cross-gradient correlation parameter ($S_2$), the signal-horizontal-gradient correlation parameter ($S_3$), the vertical-gradient correlation parameter ($S_5$), and the signal-vertical-gradient correlation parameter ($S_6$) may be implemented as follows:

$$S_1 = \sum_{(i,j)\in\Omega} \psi_x(i, j) \cdot \psi_x(i, j), \quad S_3 = \sum_{(i,j)\in\Omega} \theta(i, j) \cdot \psi_x(i, j) \quad (11)$$

$$S_2 = \sum_{(i,j)\in\Omega} \psi_x(i, j) \cdot \psi_y(i, j)$$

$$S_5 = \sum_{(i,j)\in\Omega} \Omega_y(i, j) \cdot \psi_y(i, j) \quad S_6 = \sum_{(i,j)\in\Omega} \theta(i, j) \cdot \psi_y(i, j)$$

Taking into the consideration that different number of right shifts (i.e., $n_a$ and $n_b$) are applied to $\psi_x(i, j)$, $\psi_y(i, j)$ and $\theta(i, j)$, the values of $S_1$, $S_2$, $S_3$, $S_5$ and $S_6$ are downscaled by different factors, which could change the magnitudes of the derived motion refinements ($v_x$, $v_y$). Therefore, additional left shifts may be introduced to (4) to provide the correct magnitude range of the derived motion refinements. Specifically, in an example method, the horizontal motion refinement $v_x$ and the vertical motion refinement $v_y$ may be derived as $$v_x = S_1 > 0? \; \text{clip3}(-th'_{BIO}, th'_{BIO}, -((S_3 \cdot 2^{n_b - n_a}) \gg \lfloor \log_2 S_1 \rfloor)): 0$$

$$v_y = S_5 > 0? \quad \text{clip3}(-th'_{BIO}, \quad th'_{BIO}, - ((S_6 \cdot 2^{n_b - n_a} - v_x S_2/2) \gg \lfloor \log_2 S_5 \rfloor)): 0 \quad (12)$$

Note that different from (4), the regulation parameters r and m are not applied in this embodiment. Additionally, to reduce the dynamic range of ($v_x$, $v_y$), a smaller motion refinement threshold $th'_{BIO} = 2^{13-BD}$ is applied in this embodiment, compared to $th_{BIO} = 2^{18-BD}$ in (4) of the original BIO design. In (12), the product $v_x S_2$ takes $S_2$ an input whose bit-width can be more than 16-bit such that one more-than-16-bit multiplier may be called for to calculate the value of $v_y$. To avoid such case, it is proposed to divide the value of the cross-gradient correlation parameter $S_2$ into two parts: the first part $S_{2,s}$ contains the least significant $n_{S_2}$ bits and the second part $S_{2,m}$ contains the other bits. Based on this, the value $S_2$ can be represented as $$S_2 = (S_{2,m} \ll n_{S_2}) + S_{2,s}$$

$$S_{2,m} = S_2 \gg n_{S_2}, \quad S_{2,s} = S_2 \& (2^{n_{S_2}} - 1) \quad (13)$$

Then, substituting (13) into (12), the calculation of vertical motion refinement $v_y$ becomes $$v_x = S_1 > 0? \; \text{clip3}(-th'_{BIO}, th'_{BIO}, -((S_3 \cdot 2^{n_b - n_a}) \gg \lfloor \log_2 S_1 \rfloor)): 0$$

$$v_y = S_5 > 0? \; \text{clip3}(-th'_{BIO}, th'_{BIO}, -((S_6 \cdot 2^{n_b - n_a} - ((v_x S_{2,m}) \ll n_{S_2} + v_x S_{2,s})/2) \gg \lfloor \log_2 S_5 \rfloor)): 0 \quad (14)$$

Finally, since the original L-bit internal bit-depth increase is removed in (11), the derivation of the delta b that is applied to enhance the bi-prediction sample in (9) may be modified as $$b = rnd\left(\left(v_x\left(\frac{\partial I^{(1)}(x, y)}{\partial x} - \frac{\partial I^{(0)}(x, y)}{\partial x}\right)\right)/2\right) + \quad (15)$$

$$rnd\left(\left(v_y\left(\frac{\partial I^{(1)}(x, y)}{\partial y} - \frac{\partial I^{(0)}(x, y)}{\partial y}\right)\right)/2\right)$$

In practice, different values of $n_a$, $n_b$ and $n_{S_2}$ may be applied to achieve different trade-offs between intermediate bit-width and computational cost. In some embodiments of the disclosure, it is proposed to set the values of three parameters as follows:

$n_a$ is set to be 3 and $n_b$ is set to be 6 to provide a reasonable internal bit-width of intermediate BIO parameters.

$n_{S_2}$ is set to be 12 so that all the multiplications involved in the BIO can be conducted by one 15-bit multiplier, which is the same as the multiplier that is used for the motion compensation of the HEVC.

Assuming the input video is 10-bit, Table 5 summarizes the bit-widths of the intermediate parameters when an example of a bit-width control method is applied for the BIO. As can be seen in Table 5, with the proposed example bit-width control method, the internal bit-width of the whole BIO process does not exceed 32-bit. Additionally, the multiplication with the worst possible input happens at the product of $v_x S_{2,m}$ in (14) where the input $S_{2,m}$ is 15-bit and the input $v_x$ is 4-bit. Therefore, one 15-bit multiplier is sufficient when the example method is applied for BIO.

TABLE 5

The bit-widths of intermediate parameters of the proposed bit-width control method (10-bit input video)

| Operation | Parameter | Bit-width |
|---|---|---|
| L0/L1 prediction | $I^{(0)}(i, j), I^{(1)}(i, j)$ | 16 |
| Gradient derivation | $\frac{\partial I^{(0)}}{\partial x}(i, j), \frac{\partial I^{(0)}}{\partial y}(i, j)$ | 13 |
|  | $\frac{\partial I^{(1)}}{\partial x}(i, j), \frac{\partial I^{(1)}}{\partial y}(i, j)$ | 13 |
| Correlation parameter calculation | $\theta(i, j) = (I^{(1)}(i, j) - I^{(0)}(i, j)) \gg 6$ | 11 |
|  | $\psi_x(i, j) = \left(\frac{\partial I^{(1)}}{\partial x}(i, j) + \frac{\partial I^{(0)}}{\partial x}(i, j)\right) \gg 3$ | 11 |
|  | $\psi_y(i, j) = \left(\frac{\partial I^{(1)}}{\partial y}(i, j) + \frac{\partial I^{(0)}}{\partial y}(i, j)\right) \gg 3$ | 11 |

TABLE 5-continued

The bit-widths of intermediate parameters of the
proposed bit-width control method (10-bit input video)

| Operation | Parameter | Bit-width |
|---|---|---|
| | $\psi_x(i, j) \cdot \psi_x(i, j)$ | 21 |
| | $\psi_x(i, j) \cdot \psi_y(i, j)$ | 21 |
| | $\theta(i, j) \cdot \psi_x(i, j)$ | 21 |
| | $\psi_y(i, j) \cdot \psi_y(i, j)$ | 21 |
| | $\theta(i, j) \cdot \psi_y(i, j)$ | 21 |
| Summation | $S_1 = \sum_{(i,j) \in \Omega} \psi_x(i, j) \cdot \psi_x(i, j)$ | 27 |
| | $S_2 = \sum_{(i,j) \in \Omega} \psi_x(i, j) \cdot \psi_y(i, j)$ | 27 |
| | $S_3 = \sum_{(i,j) \in \Omega} \theta(i, j) \cdot \psi_x(i, j)$ | 27 |
| | $S_5 = \sum_{(i,j) \in \Omega} \psi_y(i, j) \cdot \psi_y(i, j)$ | 27 |
| | $S_6 = \sum_{(i,j) \in \Omega} \theta(i, j) \cdot \psi_y(i, j)$ | 27 |
| Motion refinement derivation | $S_3 \cdot 2^3$ | 30 |
| | $v_x = S_1 > 0?\, \text{clip3}(-\text{th}_{BIO}', \text{th}_{BIO}', -((S_3 \cdot 2^3) >> \lfloor \log_2 S_1 \rfloor)):0$ | 4 |
| | $S_{2,m} = S_2 >> 12$ | 15 |
| | $S_{2,s} = S_2 \& (2^{12} - 1)$ | 12 |
| | $((v_x S_{2,m}) << 12 + v_x S_{2,s})/2$ | 30 |
| | $S_6 \cdot 2^3$ | 30 |
| | $S_6 \cdot 2^3 - ((v_x S_{2,m}) << n_{S_2} + v_x S_{2,s})/2$ | 31 |
| | $v_y = S_5 > 0?\, \text{clip3}(-\text{th}_{BIO}', \text{th}_{BIO}', -((S_6 \cdot 2^3 - ((v_x S_{2,m}) << 12 + v_x S_{2,s})/2) >> \lfloor \log_2 S_1 \rfloor)):0$ | 4 |
| Final bi-prediction generation | $v_x \cdot \left( \frac{\partial I^{(1)}}{\partial x}(i, j) - \frac{\partial I^{(0)}}{\partial x}(i, j) \right)$ | 17 |
| | $v_y \cdot \left( \frac{\partial I^{(1)}}{\partial y}(i, j) - \frac{\partial I^{(0)}}{\partial y}(i, j) \right)$ | 17 |

Finally, in (10), the BIO parameter $\theta(i, j)$ are calculated by applying the right shift on top of the difference between L0 and L1 prediction samples $I^{(0)}(i, j)$ and $I^{(1)}(i, j)$. As both the values of $I^{(0)}(i, j)$ and $I^{(1)}(i, j)$ are 16-bit, their difference could be one 17-bit value. Such design may not be very friendly for SIMD based software implementation. For example, a 128-bit SIMD register can only process 4 samples in parallel. Therefore, in another example method, it is proposed to apply the right shift first before calculating the difference when calculating the signal-difference parameter array $\theta(i, j)$, i.e., $$\theta(i, j) = (I^{(1)}(i, j) >> n_b) - (I^{(0)}(i, j) >> n_b) \quad (16)$$

In such an embodiment, the input values for each operation is no larger than 16-bit such that more samples can be processed in parallel. For example, by using Eq. (16), 8 samples can be processed at the same time by one 128-bit SIMD register. In some embodiments, an analogous method is also be applied to the gradient calculations in Eq. (7), such that the 4-bit right shifts are applied before calculating the difference between the L0 and L1 prediction samples to maximize the payload of each SIMD computation. Specifically, by doing so, the gradient values may be calculated as $$\frac{\partial I^{(k)}}{\partial x}(i, j) = (I^{(k)}(i+1, j)) >> 4 - (I^{(k)}(i-1, j)) >> 4 \quad (17)$$

$$\frac{\partial I^{(k)}}{\partial y}(i, j) = (I^{(k)}(i, j+1)) >> 4 - (I^{(k)}(i, j-1)) >> 4$$

$$k = 0, 1$$

Example Methods to Reduce the BIO Computational Complexity.

As shown above, the existing BIO design in the BMS-2.0 brings a large complexity increase (e.g., the number of multiplications and additions) compared to the worst-case computational complexity of the regular bi-prediction. In the following, methods are proposed to reduce the worst-case computational complexity of BIO.

BIO Complexity Reduction by Using Simplified Filter to Generate the Extended Samples.

As mentioned above, assuming the current CU is W×H, the gradients of the samples in an extended region (W+2)×(H+2) are calculated for deriving the motion refinements for all the 4×4 blocks inside the CU. In the existing BIO design, the same interpolation filters (8-tap filters) that are used for motion compensation are used to generate those extended samples. As shown in Table 3 and Table 4, the complexity due to the interpolation of the samples in the extended region are the complexity bottleneck of BIO. Therefore, to reduce the BIO complexity, instead of using 8-tap interpolation filters, it is proposed to use simplified interpolation filters with shorter tap length for the generation of the samples in the extended surrounding area of a BIO CU. On the other hand, as the generation of the extended samples could call for accessing more reference samples from the reference picture, this could increase memory bandwidth for the BIO. To avoid the memory bandwidth increase, the reference sample padding that used in the current BIO of the BMS-2.0 can be applied, where the reference samples that are outside the regular reference region (i.e., (W+7)×(H+7)) of normal motion compensation of the CU are padded by the nearest boundary samples of the regular reference region. To calculate the size of the padded reference samples, assuming the length of the simplified filter used for generating the extended samples is N, the number of padded reference samples M along each of top, left, bottom and right boundaries of the regular reference region is equal to $$M = \begin{cases} \frac{N}{2} - 2, & \frac{N}{2} > 2 \\ 0 & \text{otherwise} \end{cases} \quad (18)$$

Figure 5:
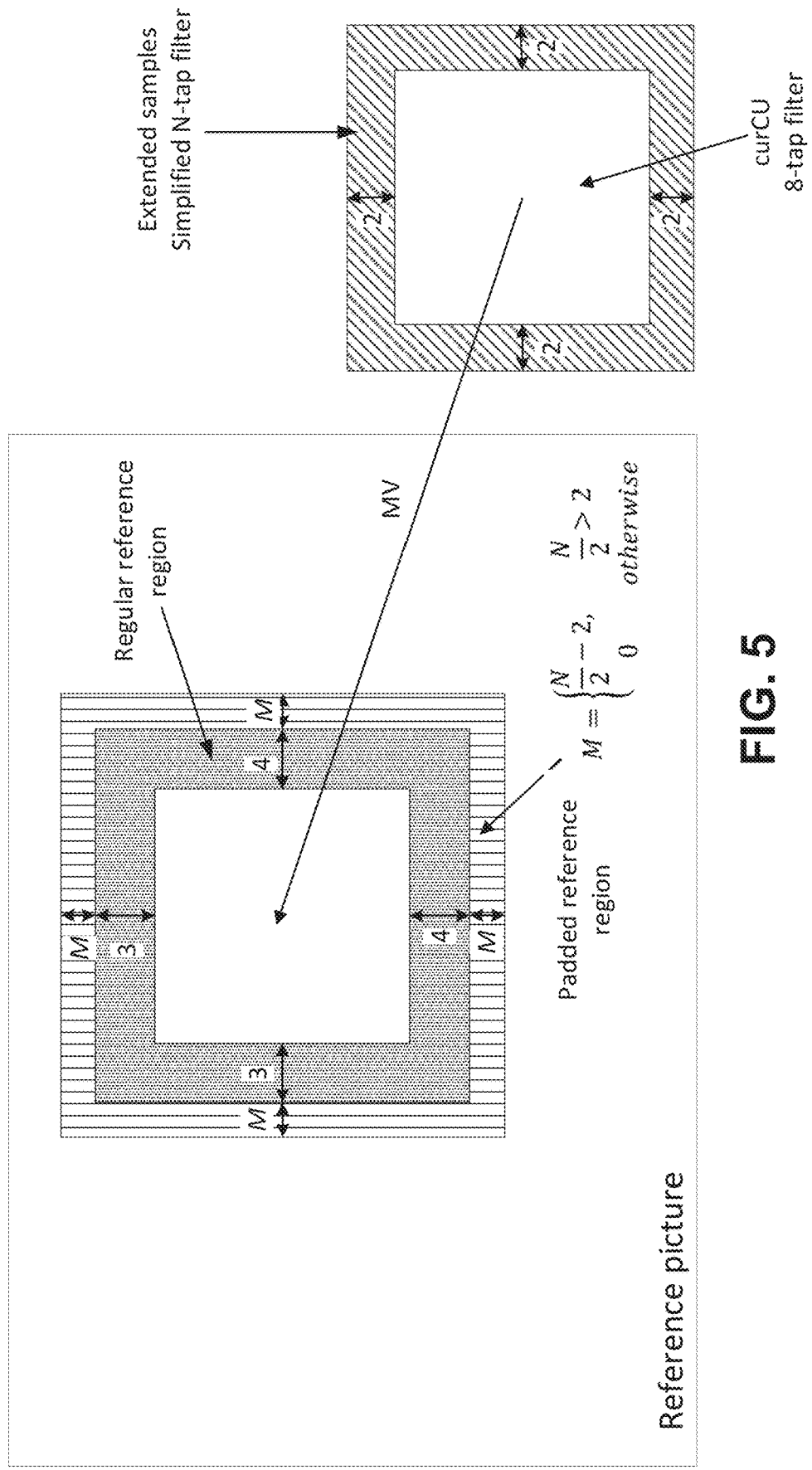
FIG. 5 illustrates a method of using simplified filters to generate the extended samples for BIO according to some embodiments.
Figure 6:
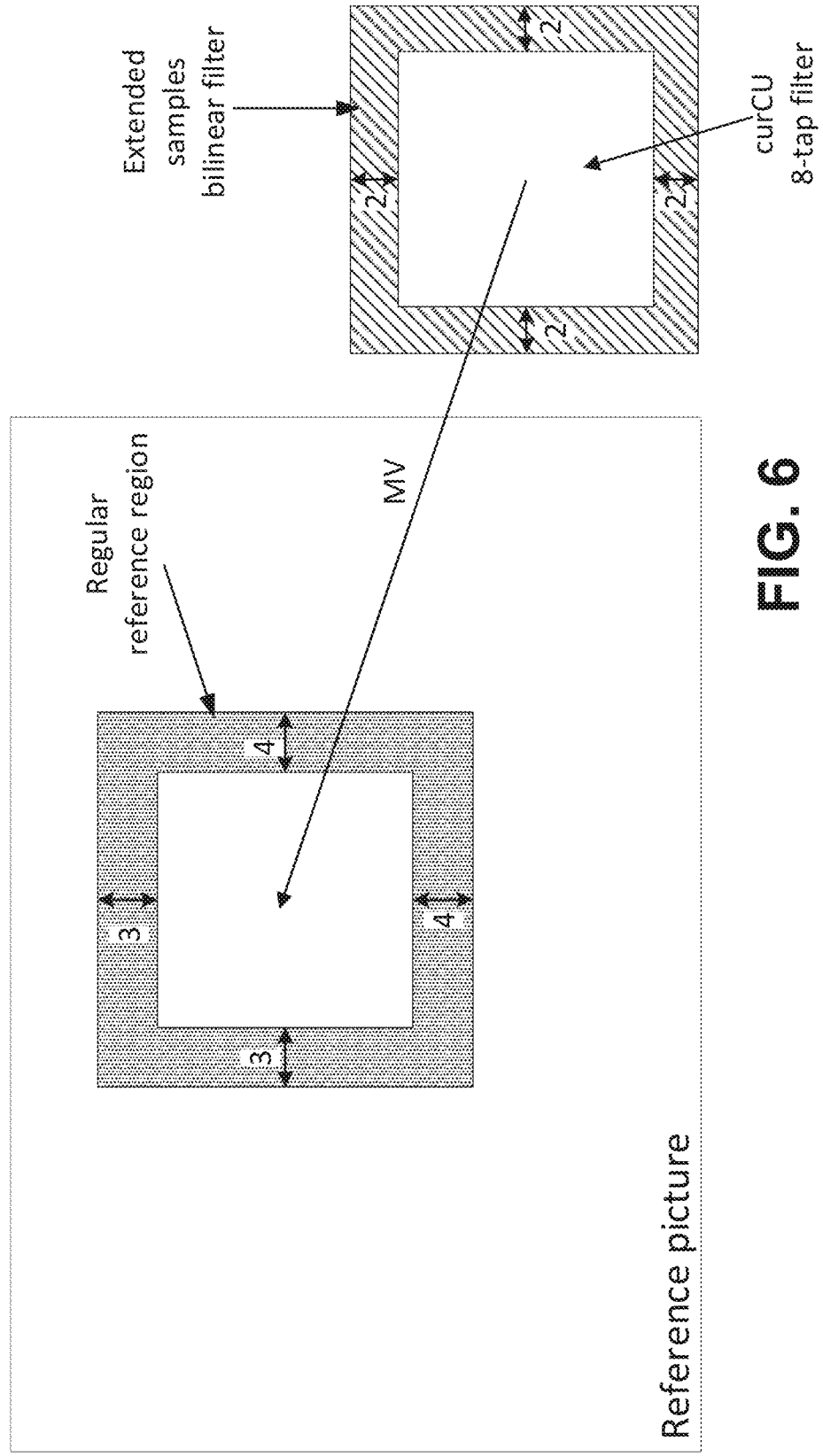
FIG. 6 illustrates a method of using simplified filters to generate the extended samples for BIO according to some embodiments.

As shown in Eq. (18), by using the 8-tap filters to generate the extended prediction samples, the reference samples on the boundaries of the regular reference regions are padded out in each direction by 2 rows or columns. FIG. 5 illustrates the use of simplified filters and reference sample padding to generate the samples in the extended region by the BIO. As can be seen in FIG. 5, the simplified filters are only used to generate the prediction samples that are in the extended region. For the locations that are inside the region of the current CU, their prediction samples are still generated by applying the default 8-tap interpolation to maintain the BIO coding efficiency. Particularly, as one embodiment of the disclosure, it is proposed to use a bilinear interpolation filter (i.e., 2-tap filter) to generate the extended samples, which further reduce the number of operations that are used for the BIO. FIG. 6 illustrates a case of using bilinear filters to interpolate the extended samples for the BIO. Prediction samples inside the CU are interpolated by default 8-tap filter. As shown in FIG. 6, due to the reduced filter length, the bilinear filter does not need to access additional reference samples outside the regular reference region to interpolate the required samples in the extended region. Therefore, the reference sample padding can be avoided in this case, which can further reduce the complexity of the BIO operations.

Additionally, based on the comparison of the complexity statistics for different CU sizes in Table 3 and Table 4, it can be found that the complexity increases are larger for CU sizes with smaller heights. For example, though 8×4 and 4×8 CUs contain the same number of samples, they present different complexity increase percentage. Specifically, for 8×4 CUs, the numbers of multiplications and additions after enabling BIO are increased by 149% and 172%, respectively; however, for 4×8 CUs, the corresponding complexity increases are 126% and 149%, respectively. Such complexity difference is caused by the fact that in the current motion compensation design the horizontal interpolation filter is applied first, followed by the vertical interpolation filter. When the applied MV points to a fractional position in the vertical direction, more intermediate samples are generated from the horizontal interpolation and used as the input for the vertical interpolation. Therefore, the complexity impacts due to the generation of more reference samples in extended region are relatively more significant for CU sizes with smaller heights.

In some embodiments, it is proposed to disable certain CU sizes with small heights to reduce the worst-case BIO complexity. Besides the above method by simply disabling certain CU sizes, another way to solve the increased number of operations in the vertical interpolation process is to simplify the interpolation filters that are used for vertical interpolation. In the current design, the same 8-tap interpolation filters are applied in both horizontal and vertical direction. To reduce the complexity, in some embodiments, it is proposed to use different interpolation filters for the interpolation filters in horizontal and vertical directions when BIO is enabled; and the filter size that is applied to the second filter process (e.g., vertical interpolation) is smaller than the filter size that is applied to the first filter process (e.g., horizontal interpolation). For example, the 4-tap chroma interpolation filters can be used to replace the current 8-tap interpolation filters for vertical interpolation. By doing so, it can provide approximately half complexity reduction for the generation of the prediction samples in the extended region. Within the CU, samples may be generated using the 8-tap filter for vertical interpolation. For further complexity reduction, the interpolation filters with even smaller size, e.g. bilinear filters, can be used.

In one specific example, referred to here as Option One, to reduce the BIO worst-case complexity, it is proposed to use the bilinear filter to generate the sample values in the extended region for the BIO and completely disable the BIO for the CUs with height of 4 (i.e., 4×4, 8×4, 16×4, 32×4, 64×4 and 128×4) and the 4×8 CUs. Table 6 and Table 7 depict the numbers of multiplications and additions that are used to perform per sample for different CU sizes by Option One and compares them to the worst-case numbers of regular bi-prediction. In Table 6 and Table 7, the highlighted rows represent the CU sizes for which the BIO is disabled. For these rows, the corresponding BIO-related operations are set to 0, and their respective complexity is the same as the regular bi-pred for CUs of the same size. As can be seen, in Option One, the peak computational complexity comes from 8×8 BIO CUs, where the number of multiplications and additions are 110% and 136% of the worst-case complexity of regular bi-prediction.

TABLE 6

The number of multiplications performed per sample by the proposed BIO method of Option One. The last column shows the percentage of multiplications relative to that of 4 × 4 bi-pred motion compensation.

| CU size (W × H) | BIO | | | | | | | |
|---|---|---|---|---|---|---|---|---|
| | L0/L1 Pred | Grad | Correlation | Summation | Motion refinement | Final bi-prediction | Total | Percentage |
| 4 × 4 | 60.0 | 0 | 0 | 0 | 0 | 0 | 60.0 | 100% |
| 4 × 8 | 46.0 | 0 | 0 | 0 | 0 | 0 | 46.0 | 77% |
| 8 × 4 | 60.0 | 0 | 0 | 0 | 0 | 0 | 60.0 | 100% |
| 4 × 16 | 50.8 | 0 | 8.4 | 0 | 0.1 | 2 | 61.3 | 102% |
| 16 × 4 | 60 | 0 | 0 | 0 | 0 | 0 | 60.0 | 100% |
| 4 × 32 | 45.4 | 0 | 8.0 | 0 | 0.1 | 2 | 55.4 | 92% |
| 32 × 4 | 60.0 | 0 | 0 | 0 | 0 | 0 | 60.0 | 100% |
| 4 × 64 | 42.7 | 0 | 7.7 | 0 | 0.1 | 2 | 52.5 | 87% |
| 64 × 4 | 60.0 | 0 | 0 | 0 | 0 | 0 | 60.0 | 100% |
| 4 × 128 | 41.3 | 0 | 7.6 | 0 | 0.1 | 2 | 51.0 | 85% |
| 128 × 4 | 60.0 | 0 | 0 | 0 | 0 | 0 | 60.0 | 100% |
| 8 × 8 | 56.3 | 0 | 7.8 | 0 | 0.1 | 2 | 66.1 | 110% |
| 8 × 16 | 46.1 | 0 | 7.0 | 0 | 0.1 | 2 | 55.2 | 92% |
| 16 × 8 | 53.6 | 0 | 7.0 | 0 | 0.1 | 2 | 62.7 | 105% |
| 8 × 32 | 41.1 | 0 | 6.6 | 0 | 0.1 | 2 | 49.8 | 83% |
| 32 × 8 | 52.3 | 0 | 6.6 | 0 | 0.1 | 2 | 61.0 | 102% |
| 8 × 64 | 38.5 | 0 | 6.4 | 0 | 0.1 | 2 | 47.0 | 78% |
| 64 × 8 | 51.7 | 0 | 6.4 | 0 | 0.1 | 2 | 60.2 | 100% |
| 8 × 128 | 37.3 | 0 | 6.3 | 0 | 0.1 | 2 | 45.7 | 76% |
| 128 × 8 | 51.3 | 0 | 6.3 | 0 | 0.1 | 2 | 59.7 | 100% |
| 16 × 16 | 43.8 | 0 | 6.3 | 0 | 0.1 | 2 | 52.2 | 87% |
| 16 × 32 | 38.9 | 0 | 6.0 | 0 | 0.1 | 2 | 46.9 | 78% |
| 32 × 16 | 42.7 | 0 | 6.0 | 0 | 0.1 | 2 | 50.7 | 84% |
| 16 × 64 | 36.5 | 0 | 5.8 | 0 | 0.1 | 2 | 44.3 | 74% |
| 64 × 16 | 42.1 | 0 | 5.8 | 0 | 0.1 | 2 | 49.9 | 83% |
| 16 × 128 | 35.2 | 0 | 5.7 | 0 | 0.1 | 2 | 43.0 | 72% |
| 128 × 16 | 41.8 | 0 | 5.7 | 0 | 0.1 | 2 | 49.6 | 83% |

TABLE 7

The number of additions performed per sample by the proposed BIO method of Option One. The last column shows the percentage of BIO additions relative to that of 4 × 4 bi-pred motion compensation.

| CU size (W × H) | BIO L0/L1 Pred | Grad | Correlation | Summation | Motion refinement | Final bi-prediction | Total | Percentage |
|---|---|---|---|---|---|---|---|---|
| 4 × 4 | 60 | 0.0 | 0.0 | 0.0 | 0.0 | 2 | 62.0 | 100% |
| 4 × 8 | 46 | 0.0 | 0.0 | 0.0 | 0.0 | 2 | 48.0 | 77% |
| 8 × 4 | 60 | 0.0 | 0.0 | 0.0 | 0.0 | 2 | 62.0 | 100% |
| 4 × 16 | 50.8 | 6.8 | 5.1 | 11.3 | 0.2 | 6 | 80.0 | 129% |
| 16 × 4 | 60 | 0.0 | 0.0 | 0.0 | 0.0 | 2 | 62.0 | 100% |
| 4 × 32 | 45.4 | 6.4 | 4.8 | 11.3 | 0.2 | 6 | 74.0 | 119% |
| 32 × 4 | 60 | 0.0 | 0.0 | 0.0 | 0.0 | 2 | 62.0 | 100% |
| 4 × 64 | 42.7 | 6.2 | 4.6 | 11.3 | 0.2 | 6 | 71.0 | 114% |
| 64 × 4 | 60 | 0.0 | 0.0 | 0.0 | 0.0 | 2 | 62.0 | 100% |
| 4 × 128 | 41.3 | 6.1 | 4.6 | 11.3 | 0.2 | 6 | 69.4 | 112% |
| 128 × 4 | 60 | 0.0 | 0.0 | 0.0 | 0.0 | 2 | 62.0 | 100% |
| 8 × 8 | 56.3 | 6.3 | 4.7 | 11.3 | 0.2 | 6 | 84.6 | 136% |
| 8 × 16 | 46.1 | 5.6 | 4.2 | 11.3 | 0.2 | 6 | 73.4 | 118% |
| 16 × 8 | 53.6 | 5.6 | 4.2 | 11.3 | 0.2 | 6 | 80.9 | 130% |
| 8 × 32 | 41.1 | 5.3 | 4.0 | 11.3 | 0.2 | 6 | 67.8 | 109% |
| 32 × 8 | 52.3 | 5.3 | 4.0 | 11.3 | 0.2 | 6 | 79.0 | 127% |
| 8 × 64 | 38.5 | 5.2 | 3.9 | 11.3 | 0.2 | 6 | 65.0 | 105% |
| 64 × 8 | 51.7 | 5.2 | 3.9 | 11.3 | 0.2 | 6 | 78.1 | 126% |
| 8 × 128 | 37.3 | 5.1 | 3.8 | 11.3 | 0.2 | 6 | 63.6 | 103% |
| 128 × 8 | 51.3 | 5.1 | 3.8 | 11.3 | 0.2 | 6 | 77.7 | 125% |
| 16 × 16 | 43.8 | 5.1 | 3.8 | 11.3 | 0.2 | 6 | 70.1 | 113% |
| 16 × 32 | 38.9 | 4.8 | 3.6 | 11.3 | 0.2 | 6 | 64.7 | 104% |
| 32 × 16 | 42.7 | 4.8 | 3.6 | 11.3 | 0.2 | 6 | 68.5 | 110% |
| 16 × 64 | 36.5 | 4.6 | 3.5 | 11.3 | 0.2 | 6 | 62.0 | 100% |
| 64 × 16 | 42.1 | 4.6 | 3.5 | 11.3 | 0.2 | 6 | 67.6 | 109% |
| 16 × 128 | 35.2 | 4.6 | 3.4 | 11.3 | 0.2 | 6 | 60.7 | 98% |
| 128 × 16 | 41.8 | 4.6 | 3.4 | 11.3 | 0.2 | 6 | 67.2 | 108% |

BIO Complexity Reduction by Reducing Size of Extended Region.

Figure 7:
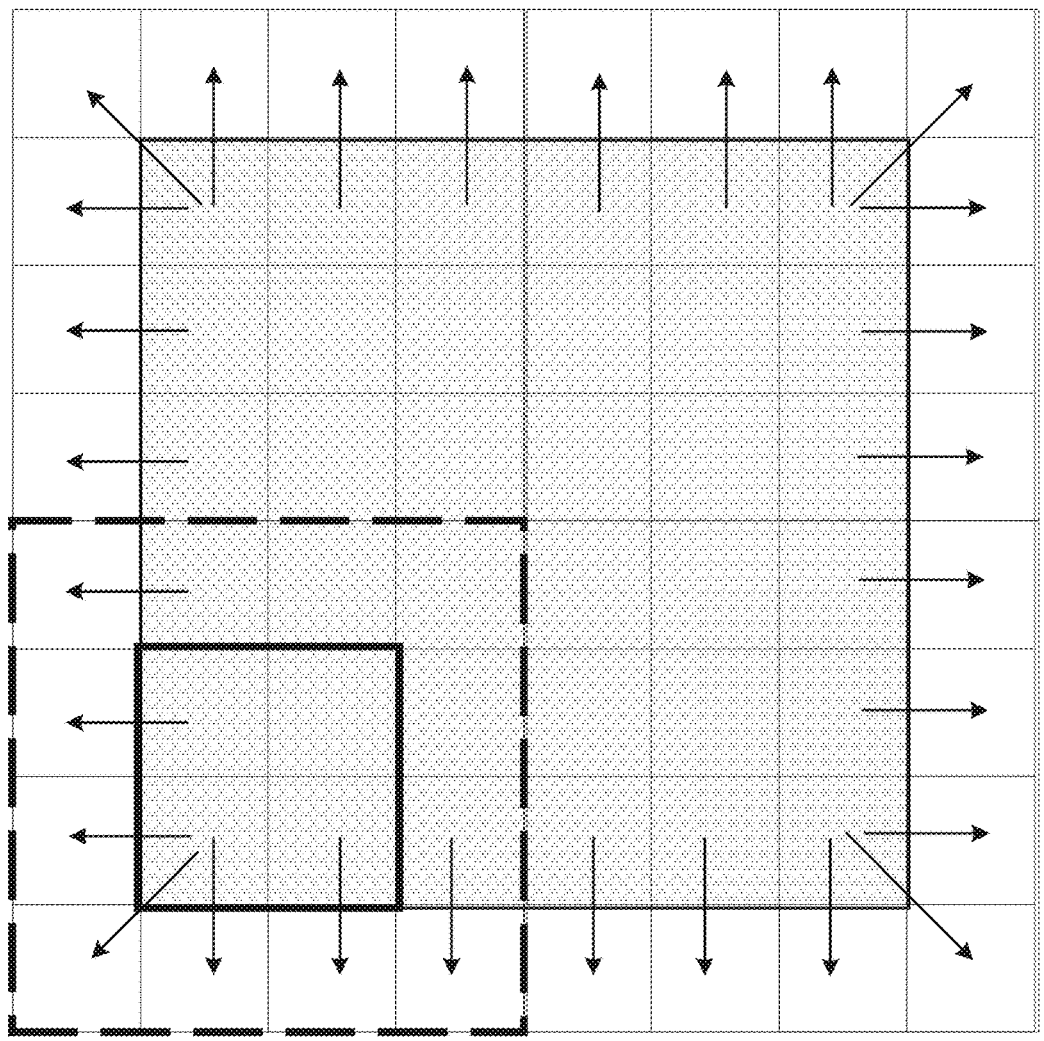
FIG. 7 illustrates sample and gradient padding to reduce the number of interpolated samples in the extended region of one BIO coding unit (CU) according to some embodiments.

As shown in FIG. 5 and FIG. 6, the BIO complexity reduction methods described above still operate to interpolate two additional rows/columns of prediction samples around each boundary of the current CU. Although simplified filters are used to reduce the number of operations, it still leads to certain complexity increases due to the number of the samples that need to be interpolated. To further reduce the BIO complexity, in some embodiments, methods are proposed to reduce the number of extended samples from two row/columns to one single row/column on each CU boundary. Specifically, instead of using (W+4)×(H+4) samples by the current BIO, some embodiments only use (W+2)×(H+2) samples for further complexity reduction. However, as indicated in (7), the gradient calculation of each sample uses both the sample values of its left and right neighbors (for horizontal gradients) or top and bottom neighbors (for vertical gradients). Therefore, by reducing the extended region size to (W+2)×(H+2), a method could only calculate the gradient values for the samples inside the CU such that the existing BIO motion refinement cannot be directly performed for the 4×4 blocks located at the four corners of the CU area. To address this issue, in some embodiments, a method is applied in which both the gradients $$\left(\text{i.e., } \frac{\partial I^{(k)}(x, y)}{\partial x} \text{ and } \frac{\partial I^{(k)}(x, y)}{\partial y}\right)$$

and samples values (i.e., $I^{(k)}(x, y)$) of the sample positions that are outside the CU are set equal to those of their nearest neighbors inside the CU. FIG. 7 illustrates such a padding process of both sample values and gradients. In FIG. 7, the dark blocks represent the prediction samples inside the CU and the white blocks represent the prediction samples in the extended region.

In the example shown in the figure, only one single row/column of additional prediction samples is generated in the extended region such that the gradients of all the samples inside the CU area (i.e., the dark blocks in FIG. 7) can be accurately derived. However, for the sub-blocks at four CU corners (e.g., the sub-block enclosed by the bolded black square in FIG. 7), because their BIO motion refinements are derived from a surrounding local region (e.g., the region enclosed by the dashed black square in FIG. 7) of the sub-blocks, they use the gradient information of some samples in the extended region (e.g., the white blocks in FIG. 7) which are however missing. To solve this problem, those missing gradients are padded by replicating the gradient values of its nearest boundary samples inside the CU area, as indicated by the arrows in FIG. 7. Additionally, if only the gradients are padded, it may cause the problem that the gradients and the sample values that are used for the sample positions in the extended area are misaligned, i.e., the samples values are their true sample values while the gradients are the gradients of their neighboring samples inside the CU. This may reduce the precision of the derived BIO motion refinement. Therefore, to avoid such misalignment, both the sample values and the gradients of the samples in the extended region are padded during the BIO derivation process.

To achieve even larger complexity reductions, in some embodiments, a padding method as proposed is combined with the method of using simplified interpolation filters and the method of disabling the BIO for certain CU sizes as described above. In one specific example, referred to here as Option Two, it is proposed to reduce the extended sample region to (W+2)×(H+2) by using the padded samples and gradients for the BIO derivation and applying the bilinear filter to generate the extended samples in one additional row/column around the CU boundaries. Additionally, BIO is not allowed to be applied for the CUs with height of 4 (i.e., 4×4, 8×4, 16×4, 32×4, 64×4 and 128×4) and the 4×8 CUs. Table 8 and Table 9 depict the corresponding numbers of multiplications and additions that are used per sample for different CU sizes after such method is applied and compare them to the worst-case numbers of regular bi-prediction. Similar to Table 6 and Table 7, the highlighted rows represent the CU sizes for which the BIO is disabled. As can be seen, by Option Two, the number of multiplications and additions are 103% and 129% of the worst-case complexity of regular bi-prediction.

TABLE 8

The number of multiplications performed per sample by the proposed BIO method of Option Two.

| CU size (W × H) | BIO | | | | | | | |
|---|---|---|---|---|---|---|---|---|
| | L0/L1 Pred | Grad | Correlation | Summation | Motion refinement | Final bi-prediction | Total | Percentage |
| 4 × 4 | 60 | 0 | 0 | 0 | 0 | 0 | 60.0 | 100% |
| 4 × 8 | 46 | 0 | 0 | 0 | 0 | 0 | 46.0 | 77% |
| 8 × 4 | 60 | 0 | 0 | 0 | 0 | 0 | 60.0 | 100% |
| 4 × 16 | 45.1 | 0 | 8.4 | 0 | 0.1 | 2 | 61.3 | 93% |
| 16 × 4 | 60 | 0 | 0 | 0 | 0 | 0 | 60.0 | 100% |
| 4 × 32 | 40.6 | 0 | 8.0 | 0 | 0.1 | 2 | 55.4 | 84% |
| 32 × 4 | 60 | 0 | 0 | 0 | 0 | 0 | 60.0 | 100% |
| 4 × 64 | 38.3 | 0 | 7.7 | 0 | 0.1 | 2 | 52.5 | 80% |
| 64 × 4 | 60 | 0 | 0 | 0 | 0 | 0 | 60.0 | 100% |
| 4 × 128 | 37.1 | 0 | 7.6 | 0 | 0.1 | 2 | 51.0 | 78% |
| 128 × 4 | 60 | 0 | 0 | 0 | 0 | 0 | 60.0 | 100% |
| 8 × 8 | 51.6 | 0 | 7.8 | 0 | 0.1 | 2 | 66.1 | 103% |
| 8 × 16 | 42.8 | 0 | 7.0 | 0 | 0.1 | 2 | 55.2 | 87% |
| 16 × 8 | 50.3 | 0 | 7.0 | 0 | 0.1 | 2 | 62.7 | 99% |
| 8 × 32 | 38.4 | 0 | 6.6 | 0 | 0.1 | 2 | 49.8 | 79% |
| 32 × 8 | 49.7 | 0 | 6.6 | 0 | 0.1 | 2 | 61.0 | 97% |
| 8 × 64 | 36.2 | 0 | 6.4 | 0 | 0.1 | 2 | 47.0 | 75% |
| 64 × 8 | 49.3 | 0 | 6.4 | 0 | 0.1 | 2 | 60.2 | 96% |
| 8 × 128 | 35.1 | 0 | 6.3 | 0 | 0.1 | 2 | 45.7 | 73% |
| 128 × 8 | 49.2 | 0 | 6.3 | 0 | 0.1 | 2 | 59.7 | 96% |
| 16 × 16 | 41.7 | 0 | 6.3 | 0 | 0.1 | 2 | 52.2 | 83% |
| 16 × 32 | 37.3 | 0 | 6.0 | 0 | 0.1 | 2 | 46.9 | 76% |
| 32 × 16 | 41.1 | 0 | 6.0 | 0 | 0.1 | 2 | 50.7 | 82% |
| 16 × 64 | 35.2 | 0 | 5.8 | 0 | 0.1 | 2 | 44.3 | 72% |
| 64 × 16 | 40.8 | 0 | 5.8 | 0 | 0.1 | 2 | 49.9 | 81% |
| 16 × 128 | 34.1 | 0 | 5.7 | 0 | 0.1 | 2 | 43.0 | 70% |
| 128 × 16 | 40.6 | 0 | 5.7 | 0 | 0.1 | 2 | 49.6 | 81% |

TABLE 9

The number of additions performed per sample by the proposed BIO method of Option Two.

| CU size (W × H) | BIO | | | | | | | |
|---|---|---|---|---|---|---|---|---|
| | L0/L1 Pred | Grad | Correlation | Summation | Motion refinement | Final bi-prediction | Total | Percentage |
| 4 × 4 | 60 | 0.0 | 0.0 | 0.0 | 0.0 | 2 | 62.0 | 100% |
| 4 × 8 | 46 | 0.0 | 0.0 | 0.0 | 0.0 | 2 | 48.0 | 77% |
| 8 × 4 | 60 | 0.0 | 0.0 | 0.0 | 0.0 | 2 | 62.0 | 100% |
| 4 × 16 | 45.1 | 6.8 | 5.1 | 11.3 | 0.2 | 6 | 80.0 | 120% |
| 16 × 4 | 60 | 0.0 | 0.0 | 0.0 | 0.0 | 2 | 62.0 | 100% |
| 4 × 32 | 40.6 | 6.4 | 4.8 | 11.3 | 0.2 | 6 | 74.0 | 112% |
| 32 × 4 | 60 | 0.0 | 0.0 | 0.0 | 0.0 | 2 | 62.0 | 100% |
| 4 × 64 | 38.3 | 6.2 | 4.6 | 11.3 | 0.2 | 6 | 71.0 | 107% |
| 64 × 4 | 60 | 0.0 | 0.0 | 0.0 | 0.0 | 2 | 62.0 | 100% |
| 4 × 128 | 37.1 | 6.1 | 4.6 | 11.3 | 0.2 | 6 | 69.4 | 105% |
| 128 × 4 | 60 | 0.0 | 0.0 | 0.0 | 0.0 | 2 | 62.0 | 100% |
| 8 × 8 | 51.6 | 6.3 | 4.7 | 11.3 | 0.2 | 6 | 84.6 | 129% |
| 8 × 16 | 42.8 | 5.6 | 4.2 | 11.3 | 0.2 | 6 | 73.4 | 113% |
| 16 × 8 | 50.3 | 5.6 | 4.2 | 11.3 | 0.2 | 6 | 80.9 | 125% |
| 8 × 32 | 38.4 | 5.3 | 4.0 | 11.3 | 0.2 | 6 | 67.8 | 105% |
| 32 × 8 | 49.7 | 5.3 | 4.0 | 11.3 | 0.2 | 6 | 79.0 | 123% |
| 8 × 64 | 36.2 | 5.2 | 3.9 | 11.3 | 0.2 | 6 | 65.0 | 101% |
| 64 × 8 | 49.3 | 5.2 | 3.9 | 11.3 | 0.2 | 6 | 78.1 | 122% |
| 8 × 128 | 35.1 | 5.1 | 3.8 | 11.3 | 0.2 | 6 | 63.6 | 99% |
| 128 × 8 | 49.2 | 5.1 | 3.8 | 11.3 | 0.2 | 6 | 77.7 | 122% |
| 16 × 16 | 41.7 | 5.1 | 3.8 | 11.3 | 0.2 | 6 | 70.1 | 110% |

TABLE 9-continued

The number of additions performed per sample by the proposed BIO method of Option Two.

| CU size (W × H) | BIO | | | | | | | |
|---|---|---|---|---|---|---|---|---|
| | L0/L1 Pred | Grad | Correlation | Summation | Motion refinement | Final bi-prediction | Total | Percentage |
| 16 × 32 | 37.3 | 4.8 | 3.6 | 11.3 | 0.2 | 6 | 64.7 | 102% |
| 32 × 16 | 41.1 | 4.8 | 3.6 | 11.3 | 0.2 | 6 | 68.5 | 108% |
| 16 × 64 | 35.2 | 4.6 | 3.5 | 11.3 | 0.2 | 6 | 62.0 | 98% |
| 64 × 16 | 40.8 | 4.6 | 3.5 | 11.3 | 0.2 | 6 | 67.6 | 107% |
| 16 × 128 | 34.1 | 4.6 | 3.4 | 11.3 | 0.2 | 6 | 60.7 | 96% |
| 128 × 16 | 40.6 | 4.6 | 3.4 | 11.3 | 0.2 | 6 | 67.2 | 107% |

In another embodiment, it is proposed to still use the default 8-tap filters to interpolate the prediction samples in the extended region of the BIO CU. However, in order to reduce the BIO complexity, the size of the extended region is decreased from (W+4)×(H+4) to (W+2)×(H+2), i.e., one additional row/column on each of top, left, bottom and right boundaries of the CU. Additionally, as described in FIG. 7, to calculate the missing gradients and avoid the misalignment between prediction samples and gradients, both the sample values and the gradients of the samples in the extended region are padded out during the BIO derivation process. Moreover, similar to option one and two, certain block-sizes may be disabled (e.g., all the CUs with height equal to 4 and the CUs in the sizes of 4×8, 4×16, 8×8, 16×8).

In another embodiment, it is proposed to discard all the prediction samples in the extended region of a BIO CU such that the BIO process only involves interpolation of the prediction samples inside the current CU region. By doing so, the corresponding operation of BIO for the generation of the prediction samples are the same as that of regular bi-prediction. However, due to the reduced number of inter-polated samples, the gradients of the boundary samples on the current CU cannot be derived by the normal BIO process. In such case, it is proposed to pad the gradient values of the internal prediction samples of the CU to be the gradients of the samples on the CU boundaries.

In another embodiment of the disclosure, referred to here as Option Three, it is proposed to reduce the extended sample region to (W+2)×(H+2) by using the padded samples and gradients for the BIO derivation and to apply the same 8-tap interpolation as that used for regular motion compensation to generate the extended samples in one additional row/column around the CU boundaries. Additionally, in Option Three, BIO is disabled for the CUs with height of 4 (i.e., 4×4, 8×4, 16×4, 32×4, 64×4 and 128×4) and for the 4×8 CUs.

Figure 10:
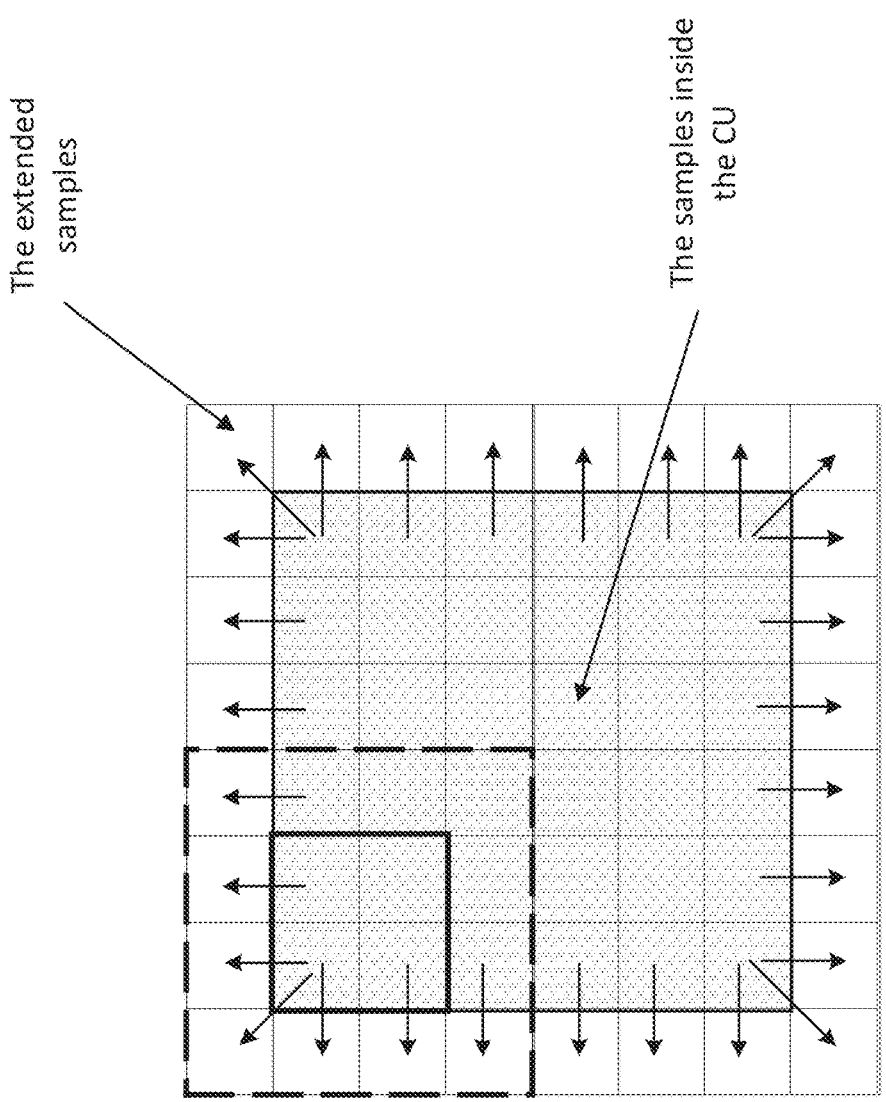
FIG. 10 illustrates using integer samples as the extended samples for the BIO derivation.

For methods described above, though the size of the extended region is reduced from (W+4)×(H+4) to (W+2)×(H+2), those methods may still operate to interpolate additional samples in one additional row/column around the boundaries of a BIO CU. As shown in Table 8 and Table 9, such methods could still bring some non-negligible complexity increases to the overall BIO complexity. To further reduce the BIO computational complexity, it is proposed in some embodiments to directly use the reference samples that are located at integer sample positions (without interpolation) and directly fetched from reference picture as the samples in the extended region and use them to derive the gradient values of the boundary samples of the current CU. FIG. 10 illustrates an embodiment in which the integer reference samples are used as the extended samples for the BIO derivation. As shown in FIG. 10, the samples inside the CU region (the shaded blocks) are generated by applying the default 8-tap interpolation filters. But, for the samples in the extended region (the unshaded blocks), instead of using interpolation filters (e.g., bilinear filter or 8-tap interpolation filters), their sample values are directly set equal to the corresponding sample values at integer sample positions in the reference picture. By doing so, all the operations introduced by the interpolation of the extended samples can be avoided, which can provide significant complexity reduction for the BIO. In another embodiment, instead of using integer reference samples, it is proposed to directly set the samples in the extended region equal to their closest neighboring sample on the CU boundaries.

Because in the above methods only one single row/column of additional prediction samples are used for the BIO derivation, in some embodiments, the padding method as illustrated in FIG. 7 may still be applied so as to pad both the sample values and the gradients of the samples on the CU boundaries to the extended region during the BIO derivation process. In some such embodiments, BIO may be disabled for certain CU sizes in order to reduce the worst-case BIO complexity. For example, in some embodiments, BIO may be disabled for CUs with height of 4 (i.e., 4×4, 8×4, 16×4, 32×4, 64×4 and 128×4) and for 4×8 CUs.

Disabling BIO for the CUs Predicted by Sub-Block Mode.

In HEVC, each prediction unit has at most one MV for a prediction direction. In contrast, two sub-block-level inter prediction techniques are included in the current VTM/BMS-2.0, including advanced temporal motion vector prediction (ATMVP), and affine mode. In those coding modes, a video block is further split into multiple small sub-blocks, the motion information for each sub-block is derived separately. The motion information for each sub-block is then used to generate the prediction signal of the block at the motion compensation stage. On the other hand, the current BIO in the BMS-2.0 can provide motion refinement at 4×4 sub-block level on top of the CU-level motion compensated prediction. Due to the fine granularity of the motion field for the CUs that are coded with the sub-blocks, the additional coding benefits that come from the refined motion by the BIO could be very limited. In some embodiments, BIO is disabled for the CUs that are coded by the sub-block modes.

Disabling BIO for CUs Using Predetermined Prediction Modes.

In VVC, several inter bi-prediction modes are based on assumption that the motion is linear and the motion vectors of list-0 and list-1 are symmetrical. These modes include Merge with MVD mode (MMVD), described in S. Jeong et al., "CE4 Ultimate motion vector expression (Test 4.5.4)", JVET-L0054, October 2018, and decoder side MV derivation with bilateral matching, described in S. Esenlik et al., "Simplified DMVR for inclusion in VVC", JVET-L0670, October 2018. Since these modes generate predictions using symmetrical motions, applying BIO on top of these predictions may not be efficient. To reduce the complexity, in some embodiments, BIO is disabled for coding units that are predicted using symmetric modes such as MMVD or decoder-side MV derivation with bilateral matching.

Multi-hypothesis prediction for intra mode is described in M.-S. Chiang et al., "CE10.1.1: Multi-hypothesis prediction for improving AMVP mode, skip or merge mode, and intra mode", JVET-L0100, October 2018. Multi-hypothesis prediction for intra mode combines one intra prediction and one inter merge indexed prediction. Since one prediction is obtained from intra prediction, in some embodiments, BIO is disabled for coding units that are predicted using this inter and intra combined multi-hypothesis prediction.

Multi-hypothesis inter prediction is described in M. Winken et al., "CE10-related: Multi-Hypothesis Inter Prediction with simplified AMVP process", JVET-L0679, October 2018. In Multi-hypothesis inter prediction, at most two additional MVs are signaled for one inter merge coded CU. There are at most four MVs for one CU: two MVs from explicit signaling; and two MVs from the merge candidate indicated by merge index. Those multiple inter predictions are combined with a weighted averaging. In this case, the prediction may be good enough. In order to reduce the complexity, in some embodiments, BIO may be disabled for coding units that are predicted using this multi-hypothesis inter prediction mode.

Coded Bitstream Structure.

Figure 8:
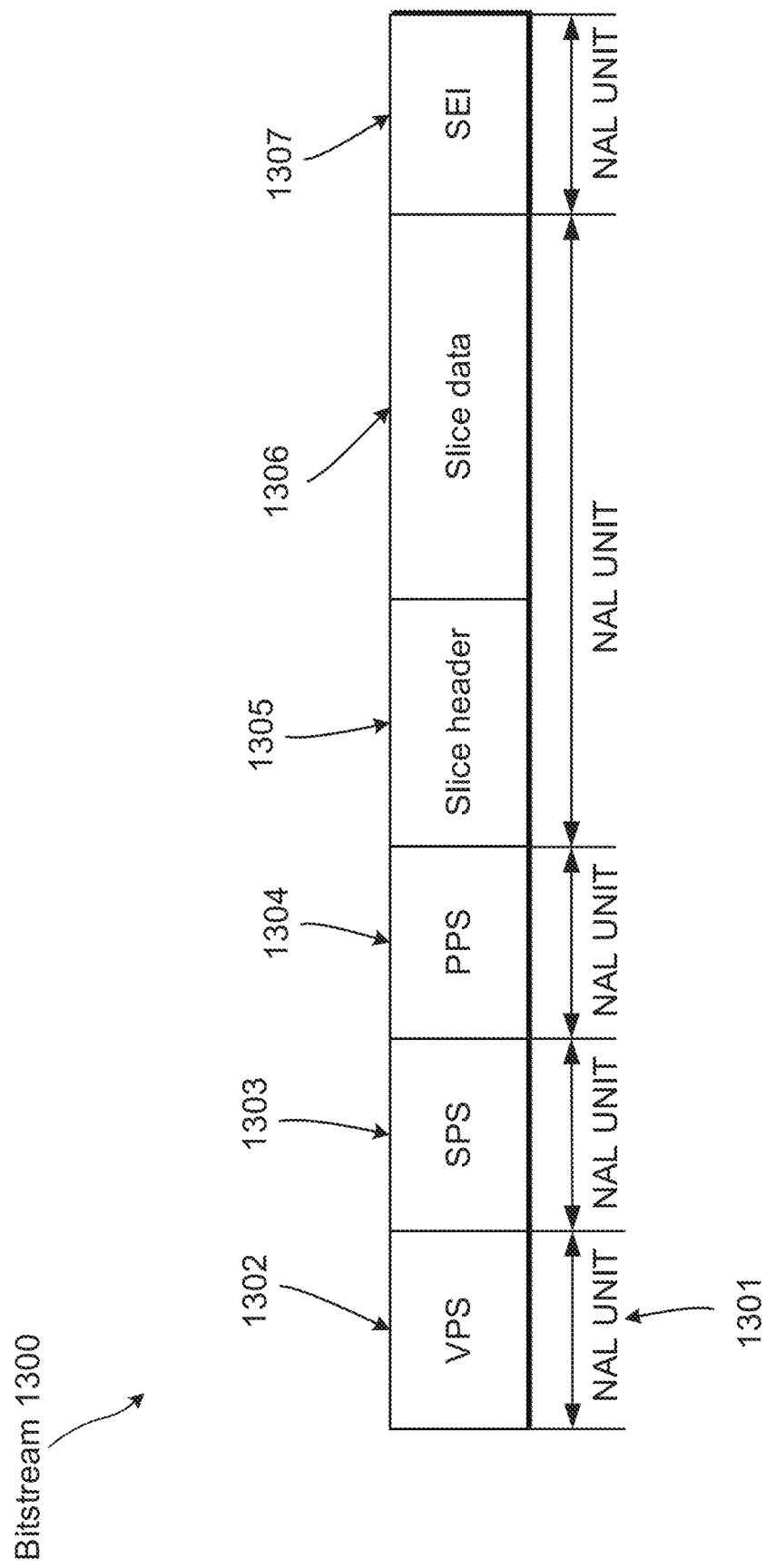
FIG. 8 is a diagram illustrating an example of a coded bitstream structure.

FIG. 8 is a diagram illustrating an example of a coded bitstream structure. A coded bitstream 1300 consists of a number of NAL (Network Abstraction layer) units 1301. A NAL unit may contain coded sample data such as coded slice 1306, or high level syntax metadata such as parameter set data, slice header data 1305 or supplemental enhancement information data 1307 (which may be referred to as an SEI message). Parameter sets are high level syntax structures containing essential syntax elements that may apply to multiple bitstream layers (e.g. video parameter set 1302 (VPS)), or may apply to a coded video sequence within one layer (e.g. sequence parameter set 1303 (SPS)), or may apply to a number of coded pictures within one coded video sequence (e.g. picture parameter set 1304 (PPS)). The parameter sets can be either sent together with the coded pictures of the video bit stream, or sent through other means (including out-of-band transmission using reliable channels, hard coding, etc.). Slice header 1305 is also a high level syntax structure that may contain some picture-related information that is relatively small or relevant only for certain slice or picture types. SEI messages 1307 carry the information that may not be needed by the decoding process but can be used for various other purposes such as picture output timing or display as well as loss detection and concealment.

Communication Devices and Systems.

Figure 9:
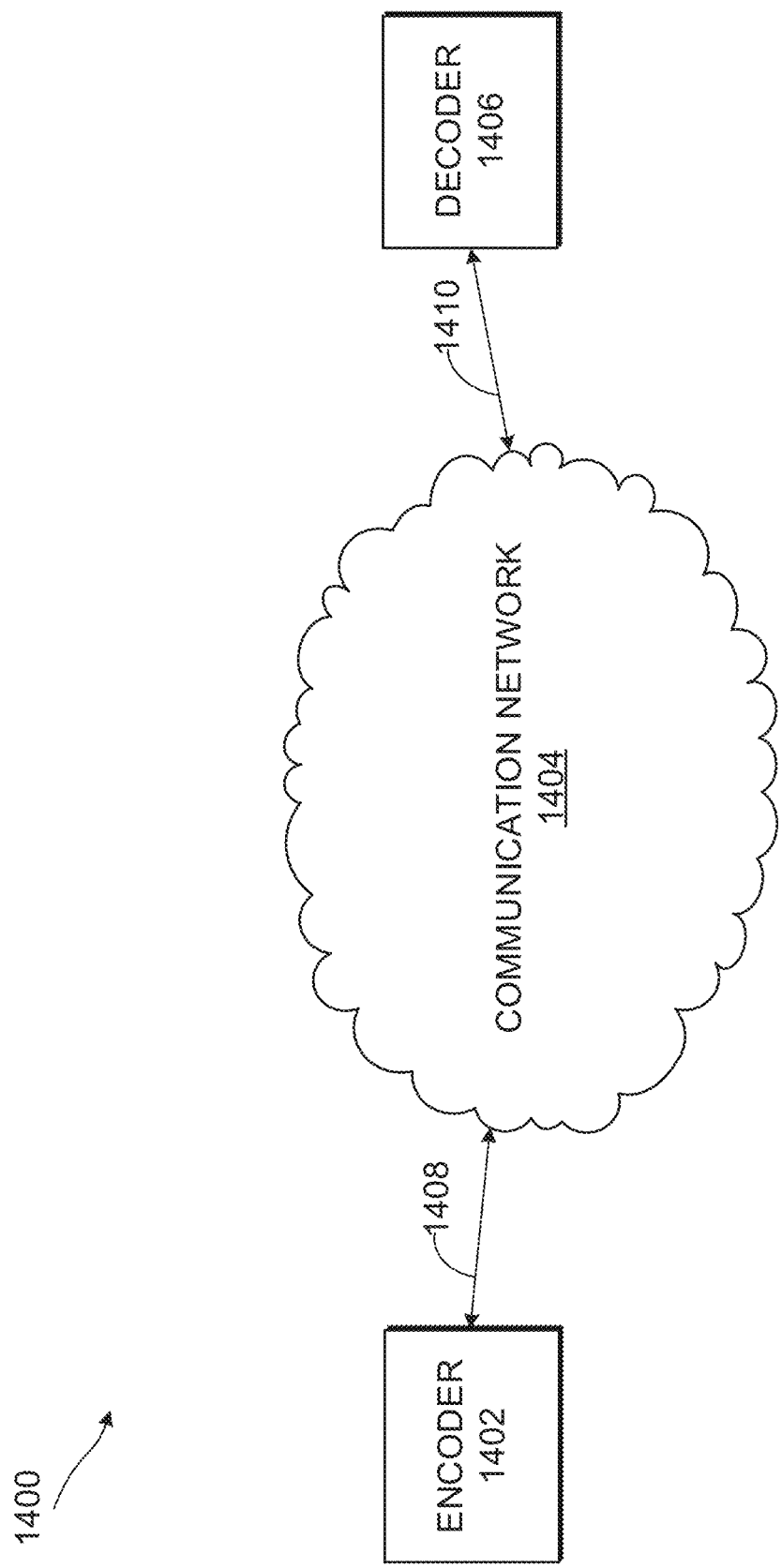
FIG. 9 is a diagram illustrating an example communication system.

FIG. 9 is a diagram illustrating an example of a communication system. The communication system 1400 may comprise an encoder 1402, a communication network 1404, and a decoder 1406. The encoder 1402 may be in communication with the network 1404 via a connection 1408, which may be a wireline connection or a wireless connection. The encoder 1402 may be similar to the block-based video encoder of FIG. 2A. The encoder 1402 may include a single layer codec (e.g., FIG. 2A) or a multilayer codec. The decoder 1406 may be in communication with the network 1404 via a connection 1410, which may be a wireline connection or a wireless connection. The decoder 1406 may be similar to the block-based video decoder of FIG. 2B. The decoder 1406 may include a single layer codec (e.g., FIG. 2B) or a multilayer codec.

The encoder 1402 and/or the decoder 1406 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1404 may be a suitable type of communication network. For example, the communications network 1404 may be a multiple access system that provides content, such as voice, data, video, messaging, broadcast, etc., to multiple wireless users. The communications network 1404 may enable multiple wireless users to access such content through the sharing of system resources, including wireless bandwidth. For example, the communications network 1404 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1404 may include multiple connected communication networks. The communication network 1404 may include the Internet and/or one or more private commercial networks such as cellular networks, WiFi hotspots, Internet Service Provider (ISP) networks, and/or the like.

Encoder and Decoder Systems and Methods

In some embodiments, a method is provided for encoding or decoding of a video. The method includes, for at least one current block in the video coded using bi-directional optical flow: calculating a first gradient component based on a first prediction signal from a first reference picture; calculating a second gradient component based on a second prediction signal from a second reference picture; summing the first and second gradient components and performing downward bit-shifting of the resulting sum to generate a reduced-bit-width correlation parameter; calculating motion refinement based at least in part on the reduced-bit-width correlation parameter; and predicting the block with bi-directional optical flow using the calculated motion refinement.

The in some embodiments, the first gradient component is $\partial I^{(0)}/\partial x$, the second gradient component is $\partial I^{(1)}/\partial x$, and the reduced-bit-width correlation parameter is $$\psi_x(i, j) = \left(\frac{\partial I^{(1)}}{\partial x}(i, j) + \frac{\partial I^{(0)}}{\partial x}(i, j)\right) \gg n_a.$$

In some embodiments, the first gradient component is $\partial I^{(0)}/\partial y$, the second gradient component is $\partial I^{(1)}/\partial y$, and the reduced-bit-width correlation parameter is $$\psi_y(i, j) = \left(\frac{\partial I^{(1)}}{\partial y}(i, j) + \frac{\partial I^{(0)}}{\partial y}(i, j)\right) \gg n_a.$$

In some embodiments, a method is provided of encoding or decoding a video. The method includes, for at least one current block in the video coded using bi-directional optical flow: generating a reduced-bit-width correlation parameter by subtracting a first prediction signal based on a first reference picture from a second prediction signal based on a second reference picture and performing downward bit-shifting of the resulting difference; calculating motion refinement based at least in part on the reduced-bit-width correlation parameter; and predicting the block with bi-directional optical flow using the calculated motion refinement.

In some embodiments, the first prediction signal is $I^{(0)}$, the second prediction signal is $I^{(1)}$, and the reduced-bit-width correlation parameter is $\theta(i, j)=(I^{(1)}(i, j)-I^{(0)}(i, j))>>n_b$.

In some embodiments, a method is provided of encoding or decoding a video. The method includes, for at least one current block in the video coded using bi-directional optical flow: calculating horizontal motion refinement as $v_x=S_1>0?\ \text{clip3}(-th'_{BIO},\ th'_{BIO},\ -((S_3 \cdot 2^{n_b-n_a})>>\lfloor \log_2 S_1 \rfloor)): 0;$ calculating vertical motion refinement as $v_y=S_5>0?\ \text{clip3}(-th'_{BIO},\ th'_{BIO},\ -((S_6 \cdot 2^{n_b-n_a}-v_x S_2/2)>>\lfloor \log_2 S_5 \rfloor)): 0;$ and predicting the block with bi-directional optical flow using the calculated horizontal and vertical motion refinement. In some such embodiments, $S_1=\Sigma_{(i,j)\in\Omega}\psi_x(i,j)\cdot\psi_x(i,j)$, $S_2=\Sigma_{(i,j)\in\Omega}\psi_x(i,j)\cdot\psi_y(i,j)$, $S_3=\Sigma_{(i,j)\in\Omega}\theta(i,j)\cdot\psi_x(i,j)$, $S_5=\Sigma_{(i,j)\in\Omega}\psi_y(i,j)\cdot\psi_y(i,j)$, and $S_6=\Sigma_{(i,j)\in\Omega}\theta(i,j)\cdot\psi_y(i,j)$.

In some embodiments, a method is provided for encoding or decoding a video. The method includes, for at least one current block in the video coded using bi-directional optical flow: generating a reduced-bit-width first prediction signal by performing a downward bit-shifting on a first prediction signal from first reference picture; generating a reduced-bit-width second prediction signal by performing a downward bit-shifting on a second prediction signal from second reference picture; generating a reduced-bit-width correlation parameter by subtracting the reduced-bit-width first prediction signal from the reduced-bit-width second prediction signal; calculating motion refinement based at least in part on the reduced-bit-width correlation parameter; and predicting the block with bi-directional optical flow using the calculated motion refinement. In some such embodiments, the reduced-bit-width correlation parameter is $\theta(i, j)=(I^{(1)}(i, j)>>n_b)-(I^{(0)}(i, j)>>n_b)$.

In some embodiments, a method is provided of coding a video. The method includes, for at least one current block in the video coded using bi-directional optical flow: calculating a reduced-bit-width first gradient component based on a reduced-bit-width first prediction signal from a first reference picture; calculating a reduced-bit-width second gradient component based on a reduced-bit width second prediction signal from a second reference picture; summing the first and second reduced-bit-width gradient components to generate a reduced-bit-width correlation parameter; calculating motion refinement based at least in part on the reduced-bit-width correlation parameter; and predicting the block with bi-directional optical flow using the calculated motion refinement.

In some such embodiments, the reduced-bit-width first gradient component is $\partial I^{(0)}/\partial x$, the reduced-bit-width second gradient component is $\partial I^{(1)}/\partial x$, and the reduced-bit-width correlation parameter is $$\psi_x(i, j) = \left(\frac{\partial I^{(1)}}{\partial x}(i, j) + \frac{\partial I^{(0)}}{\partial x}(i, j)\right) \gg n_a.$$

In some embodiments, the reduced-bit-width first gradient component is $\partial I^{(0)}/\partial y$, the reduced-bit-width second gradient component is $\partial I^{(1)}/\partial y$, and the reduced-bit-width correlation parameter is $$\psi_y(i, j) = \left(\frac{\partial I^{(1)}}{\partial y}(i, j) + \frac{\partial I^{(0)}}{\partial y}(i, j)\right) \gg n_a.$$

In some embodiments, calculating the reduced-bit-width first gradient component based on a reduced-bit-width first prediction signal from a first reference picture comprises calculating $$\frac{\partial I^{(0)}}{\partial x}(i, j) = \left(I^{(0)}(i+1, j)\right) \gg 4 - \left(I^{(0)}(i-1, j)\right) \gg 4$$

and calculating the reduced-bit-width second gradient component based on a reduced-bit-width second prediction signal from a second reference picture comprises calculating $$\frac{\partial I^{(1)}}{\partial x}(i, j) = \left(I^{(1)}(i+1, j)\right) \gg 4 - \left(I^{(1)}(i-1, j)\right) \gg 4$$

In some embodiments, calculating the reduced-bit-width first gradient component based on a reduced-bit-width first prediction signal from a first reference picture comprises calculating $$\frac{\partial I^{(0)}}{\partial y}(i, j) = \left(I^{(0)}(i, j+1)\right) \gg 4 - \left(I^{(0)}(i, j-1)\right) \gg 4$$

and calculating the reduced-bit-width second gradient component based on a reduced-bit-width second prediction signal from a second reference picture comprises calculating $$\frac{\partial I^{(1)}}{\partial y}(i, j) = \left(I^{(1)}(i, j+1)\right) \gg 4 - \left(I^{(1)}(i, j-1)\right) \gg 4$$

In some embodiments, a method is provided of coding a video, where the method includes, for at least one current block in the video coded using bi-directional optical flow: generating first and second motion-compensated prediction signals for samples in the current block, wherein the first and second motion-compensated prediction signals for samples in the current block are generated using a first interpolation filter having a first number of taps; generating first and second motion-compensated prediction signals for samples in an extended region around the current block, wherein the first and second motion-compensated prediction signals for samples outside the current block are generated using a second interpolation filter having a second number of taps lower than the first number of taps; calculating motion refinement based at least in part on the first and second motion-compensated prediction signals; and predicting the block with bi-directional optical flow using the calculated motion refinement.

In some embodiments, the first interpolation filter is an 8-tap filter and the second interpolation filter is a 2-tap filter. In some embodiments, the second interpolation filter is a bilinear interpolation filter.

In some embodiments, a method is provided of coding a video, where the method includes, for at least one current block in the video coded using bi-directional optical flow: generating first and second motion-compensated prediction signals, wherein the first and second motion-compensated prediction signals for samples in the current block are generated using a horizontal interpolation filter having a first number of taps and a vertical interpolation filter having a second number of taps lower than the first number of taps; calculating motion refinement based at least in part on the first and second motion-compensated prediction signals; and predicting the block with bi-directional optical flow using the calculated motion refinement.

In some embodiments, a method of coding a video includes, for at least one current block in the video coded using bi-directional optical flow: generating first and second motion-compensated prediction signals, wherein the first and second motion-compensated prediction signals for samples in the current block are generated using a horizontal interpolation filter having a first number of taps and a vertical interpolation filter having a second number of taps, wherein the horizontal and vertical filters are applied in a predetermined sequence, and wherein the filter applied earlier in the sequence has a higher number of taps than the filter applied later in the sequence; calculating motion refinement based at least in part on the first and second motion-compensated prediction signals; and predicting the block with bi-directional optical flow using the calculated motion refinement.

In some embodiments, a method is provided of coding a video comprising a plurality of coding units, the method comprising, for a plurality of coding units in the video coded using bi-prediction: disabling bi-directional optical flow at least for the coding units having a height of four; performing bi-prediction without bi-directional optical flow for the bi-predicted coding units for which bi-directional optical flow is disabled; and performing bi-prediction with bi-directional optical flow for the bi-predicted coding units for which bi-directional optical flow is not disabled. In some such embodiments, bi-directional optical flow is further disabled for coding units having a height of eight and a width of four.

In some embodiments, a method is provided of coding a video comprising a plurality of coding units. The method includes, for a plurality of coding units in the video coded using bi-prediction: disabling bi-directional optical flow at least for the coding units having a height no greater than a threshold height; performing bi-prediction without bi-directional optical flow for the bi-predicted coding units for which bi-directional optical flow is disabled; and performing bi-prediction with bi-directional optical flow for the bi-predicted coding units for which bi-directional optical flow is not disabled.

In some embodiments, a method is provided of coding a video. The method includes, for at least one current block in the video coded using bi-directional optical flow: generating first and a second motion-compensated prediction signals for samples in the current block; generating first and second values for samples in an extended region around the current block, wherein the extended region does not include samples that are more than one row or column away from the current block; calculating motion refinement based at least in part on the first and second motion-compensated prediction signals and the first and second values for samples in the extended region; and predicting the block with bi-directional optical flow using the calculated motion refinement.

In some such embodiments, generating the first values for samples in the extended region comprises setting each first sample value in the extended region equal to the first predicted sample value of its respective nearest neighbor in the current block. In some embodiments, generating the second values for samples in the extended region comprises setting each second sample value in the extended region equal to the second predicted sample value of its respective nearest neighbor in the current block.

Some embodiments further include generating first and second gradient values at samples in the extended region around the current block, wherein: generating the first gradient values at samples in the extended region comprises setting each first gradient value in the extended region equal to a gradient value calculated at its respective nearest neighbor in the current block using the first prediction signal; and generating the second gradient values at samples in the extended region comprises setting each second gradient value in the extended region equal to a gradient value calculated at its respective nearest neighbor in the current block using the second prediction signal.

In some embodiments, a method is provided of coding a video comprising a plurality of coding units. The method includes, for a plurality of coding units in the video coded using bi-prediction: disabling bi-directional optical flow at least for the coding units predicted using a sub-block-level inter prediction technique; performing bi-prediction without bi-directional optical flow for the bi-predicted coding units for which bi-directional optical flow is disabled; and performing bi-prediction with bi-directional optical flow for the bi-predicted coding units for which bi-directional optical flow is not disabled.

In some such embodiments, bi-prediction is disabled at least for coding units predicted using advanced temporal motion vector prediction (ATMVP).

In some embodiments, bi-prediction is disabled at least for coding units predicted using affine prediction.

In some embodiments, a method is provided of coding a video comprising a plurality of coding units. The method includes, for a plurality of coding units in the video coded using bi-prediction: disabling bi-directional optical flow at least for the coding units having a height of four; performing bi-prediction without bi-directional optical flow for the bi-predicted coding units for which bi-directional optical flow is disabled; and performing bi-prediction with bi-directional optical flow for the bi-predicted coding units for which bi-directional optical flow is not disabled, wherein performing bi-prediction with bi-directional optical flow for each current coding unit comprises: generating first and second motion-compensated prediction signals for samples in the current coding unit, wherein the first and second motion-compensated prediction signals for samples in the current block are generated using a first interpolation filter having a first number of taps; generating first and second motion-compensated prediction signals for samples in an extended region around the current coding unit, wherein the first and second motion-compensated prediction signals for samples outside the current coding unit are generated using a second interpolation filter having a second number of taps lower than the first number of taps; calculating motion refinement based at least in part on the first and second motion-compensated prediction signals; and predicting the current coding unit with bi-directional optical flow using the calculated motion refinement.

In some such embodiments, the first interpolation filter is an 8-tap filter and the second interpolation filter is a 2-tap filter. In some embodiments, the second interpolation filter is a bilinear interpolation filter.

In some embodiments, bi-directional optical flow is further disabled for coding units having a height of eight and a width of four.

In some embodiments, a method is provided of coding a video comprising a plurality of coding units. The method includes, for a plurality of coding units in the video coded using bi-prediction: disabling bi-directional optical flow at least for the coding units having a height of four; performing bi-prediction without bi-directional optical flow for the bi-predicted coding units for which bi-directional optical flow is disabled; and performing bi-prediction with bi-directional optical flow for the bi-predicted coding units for which bi-directional optical flow is not disabled, wherein performing bi-prediction with bi-directional optical flow for each current coding unit comprises: generating first and a second motion-compensated prediction signals for samples in the current coding unit; generating first and second values for samples in an extended region around the current coding unit, wherein the extended region does not include samples that are more than one row or column away from the current coding unit; calculating motion refinement based at least in part on the first and second motion-compensated prediction signals and the first and second values for samples in the extended region; and predicting the current coding unit with bi-directional optical flow using the calculated motion refinement.

In some embodiments, generating the first values for samples in the extended region comprises setting each first sample value in the extended region equal to the first predicted sample value of its respective nearest neighbor in the current coding unit.

In some embodiments, generating the second values for samples in the extended region comprises setting each second sample value in the extended region equal to the second predicted sample value of its respective nearest neighbor in the current coding unit.

Some embodiments further include generating first and second gradient values at samples in the extended region around the current coding unit, wherein: generating the first gradient values at samples in the extended region comprises setting each first gradient value in the extended region equal to a gradient value calculated at its respective nearest neighbor in the current coding unit using the first prediction signal; and generating the second gradient values at samples in the extended region comprises setting each second gradient value in the extended region equal to a gradient value calculated at its respective nearest neighbor in the current coding unit using the second prediction signal.

In some such embodiments, bi-directional optical flow is further disabled for coding units having a height of eight and a width of four.

In some embodiments, a method is provided of coding a video, the method including, for at least one current block in the video coded using bi-directional optical flow: generating first and second motion-compensated prediction signals for samples in the current block, wherein the first and second motion-compensated prediction signals for samples in the current block are generated using a horizontal interpolation filter having a first number of taps and a vertical interpolation filter having the first number of taps; generating first and second motion-compensated prediction signals for samples in an extended region around the current block, wherein the first and second motion-compensated prediction signals for samples outside the current block are generated using a horizontal interpolation filter having the first number of taps and a vertical interpolation filter having a second number of taps lower than the first number of taps; calculating motion refinement based at least in part on the first and second motion-compensated prediction signals; predicting the block with bi-directional optical flow using the calculated motion refinement.

In some embodiments, a method is provided of coding a video comprising a plurality of coding units, the method comprising, for a plurality of coding units in the video coded using bi-prediction: disabling bi-directional optical flow at least for the coding units predicted using a symmetric prediction mode; performing bi-prediction without bi-directional optical flow for the bi-predicted coding units for which bi-directional optical flow is disabled; and performing bi-prediction with bi-directional optical flow for the bi-predicted coding units for which bi-directional optical flow is not disabled.

In some embodiments, bi-prediction is disabled at least for coding units predicted using merge with MVD mode (MMVD). In some embodiments, bi-prediction is disabled at least for coding units predicted using decoder-side MV derivation with bilateral matching.

In some embodiments, a method is provided of coding a video comprising a plurality of coding units. The method includes, for a plurality of coding units in the video coded using bi-prediction: disabling bi-directional optical flow at least for the coding units predicted using multi-hypothesis prediction for intra mode; performing bi-prediction without bi-directional optical flow for the bi-predicted coding units for which bi-directional optical flow is disabled; and performing bi-prediction with bi-directional optical flow for the bi-predicted coding units for which bi-directional optical flow is not disabled.

In some embodiments, a method is provided for coding a video comprising a plurality of coding units. The method includes, for a plurality of coding units in the video coded using bi-prediction: disabling bi-directional optical flow at least for the coding units predicted using multi-hypothesis inter prediction; performing bi-prediction without bi-directional optical flow for the bi-predicted coding units for which bi-directional optical flow is disabled; and performing bi-prediction with bi-directional optical flow for the bi-predicted coding units for which bi-directional optical flow is not disabled.

Note that various hardware elements of one or more of the described embodiments are referred to as "modules" that carry out (i.e., perform, execute, and the like) various functions that are described herein in connection with the respective modules. As used herein, a module includes hardware (e.g., one or more processors, one or more microprocessors, one or more microcontrollers, one or more microchips, one or more application-specific integrated circuits (ASICs), one or more field programmable gate arrays (FPGAs), one or more memory devices) deemed suitable by those of skill in the relevant art for a given implementation.

Each described module may also include instructions executable for carrying out the one or more functions described as being carried out by the respective module, and it is noted that those instructions could take the form of or include hardware (i.e., hardwired) instructions, firmware instructions, software instructions, and/or the like, and may be stored in any suitable non-transitory computer-readable medium or media, such as commonly referred to as RAM, ROM, etc.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A video encoding method comprising:
   obtaining a first array of first-component gradients based on a first prediction signal array from a first reference picture;
   obtaining a second array of first-component gradients based on a second prediction signal array from a second reference picture;
   obtaining a first-component intermediate parameter array including performing a right bit shift on a sum of the first array of first-component gradients and the second array of first-component gradients;
   obtaining at least a first-component motion refinement based at least in part on the first-component intermediate parameter array; and
   generating a prediction of a current block in a video with bi-directional optical flow using at least the first-component motion refinement.

2. The method of claim 1, wherein the first-component intermediate parameter array is a horizontal intermediate parameter array and the first-component motion refinement is a horizontal motion refinement, further comprising:
   obtaining a signal-difference parameter array by a obtaining a difference between the first prediction signal array and the second prediction signal array; and
   obtaining a signal-horizontal-gradient correlation parameter by summing components of an elementwise multiplication of the signal-difference parameter array with the horizontal gradient intermediate parameter array;
   wherein obtaining the horizontal motion refinement comprises bit-shifting the signal-horizontal-gradient correlation parameter to obtain the horizontal motion refinement.

3. The method of claim 2, wherein obtaining the signal-difference parameter array comprises performing a right bit shift on each of the first prediction signal array and the second prediction signal array before obtaining the difference between the first prediction signal array and the second prediction signal array.

4. The method of claim 1, wherein the first component is a horizontal component, with the first array of first-component gradients being a first horizontal gradient array, the second array of first-component gradients being a second horizontal gradient array, the first-component intermediate parameter array being a horizontal intermediate parameter array obtained by performing a right bit shift on a sum of the first horizontal gradient array and the second horizontal gradient array, and the first-component motion refinement being a horizontal motion refinement, the method further comprising:
   obtaining a first vertical gradient array based on the first prediction signal array from the first reference picture;
   obtaining a second vertical gradient array based on the second prediction signal array from the second reference picture;
   obtaining a vertical intermediate parameter array including performing a right bit shift on a sum of the first vertical gradient array and the second vertical gradient array; and
   obtaining a vertical motion refinement based at least in part on the horizontal intermediate parameter array and the vertical intermediate parameter array;
   wherein the prediction of the current block is generated using the horizontal motion refinement and the vertical motion refinement.

5. The method of claim 4, further comprising:
   obtaining a cross-gradient correlation parameter by summing components of an elementwise multiplication of the horizontal intermediate parameter array with the vertical intermediate parameter array;
   wherein obtaining the vertical motion refinement comprises determining a product of the horizontal motion refinement and the cross-gradient correlation parameter.

6. A video encoder comprising one or more processors configured to perform:
   obtaining a first array of first-component gradients based on a first prediction signal array from a first reference picture;
   obtaining a second array of first-component gradients based on a second prediction signal array from a second reference picture;
   obtaining a first-component intermediate parameter array including performing a right bit shift on a sum of the first array of first-component gradients and the second array of first-component gradients;
   obtaining at least a first-component motion refinement based at least in part on the first-component intermediate parameter array; and
   generating a prediction of a current block in a video with bi-directional optical flow using at least the first-component motion refinement.

7. The video encoder of claim 6, wherein the first-component intermediate parameter array is a horizontal intermediate parameter array and the first-component motion refinement is a horizontal motion refinement, the encoder being further configured to perform:
   obtaining a signal-difference parameter array by a obtaining a difference between the first prediction signal array and the second prediction signal array; and
   obtaining a signal-horizontal-gradient correlation parameter by summing components of an elementwise multiplication of the signal-difference parameter array with the horizontal gradient intermediate parameter array;
   wherein obtaining the horizontal motion refinement comprises bit-shifting the signal-horizontal-gradient correlation parameter to obtain the horizontal motion refinement.

8. The video encoder of claim 7, wherein obtaining the signal-difference parameter array comprises performing a right bit shift on each of the first prediction signal array and the second prediction signal array before obtaining the difference between the first prediction signal array and the second prediction signal array.

9. The video encoder of claim 5, wherein the first component is a horizontal component, with the first array of first-component gradients being a first horizontal gradient array, the second array of first-component gradients being a second horizontal gradient array, the first-component intermediate parameter array being a horizontal intermediate parameter array obtained by performing a right bit shift on a sum of the first horizontal gradient array and the second horizontal gradient array, and the first-component motion refinement being a horizontal motion refinement, the video encoder further configured to perform:
  obtaining a first vertical gradient array based on the first prediction signal array from the first reference picture;
  obtaining a second vertical gradient array based on the second prediction signal array from the second reference picture;
  obtaining a vertical intermediate parameter array including performing a right bit shift on a sum of the first vertical gradient array and the second vertical gradient array; and
  obtaining a vertical motion refinement based at least in part on the horizontal intermediate parameter array and the vertical intermediate parameter array;
  wherein the prediction of the current block is generated using the horizontal motion refinement and the vertical motion refinement.

10. The video encoder of claim 9, further configured to perform:
  obtaining a cross-gradient correlation parameter by summing components of an elementwise multiplication of the horizontal intermediate parameter array with the vertical intermediate parameter array;
  wherein obtaining the vertical motion refinement comprises determining a product of the horizontal motion refinement and the cross-gradient correlation parameter.

11. A video decoding method comprising:
  obtaining a first array of first-component gradients based on a first prediction signal array from a first reference picture;
  obtaining a second array of first-component gradients based on a second prediction signal array from a second reference picture;
  obtaining a first-component intermediate parameter array including performing a right bit shift on a sum of the first array of first-component gradients and the second array of first-component gradients;
  obtaining at least a first-component motion refinement based at least in part on the first-component intermediate parameter array; and
  generating a prediction of a current block in a video with bi-directional optical flow using at least the first-component motion refinement.

12. The method of claim 11, wherein the first-component intermediate parameter array is a horizontal intermediate parameter array and the first-component motion refinement is a horizontal motion refinement, the method further comprising:
  obtaining a signal-difference parameter array by obtaining a difference between the first prediction signal array and the second prediction signal array; and
  obtaining a signal-horizontal-gradient correlation parameter by summing components of an elementwise multiplication of the signal-difference parameter array with the horizontal gradient intermediate parameter array;
  wherein obtaining the horizontal motion refinement comprises bit-shifting the signal-horizontal-gradient correlation parameter to obtain the horizontal motion refinement.

13. The method of claim 12, wherein obtaining the signal-difference parameter array comprises performing a right bit shift on each of the first prediction signal array and the second prediction signal array before obtaining the difference between the first prediction signal array and the second prediction signal array.

14. The method of claim 11, wherein the first component is a horizontal component, with the first array of first-component gradients being a first horizontal gradient array, the second array of first-component gradients being a second horizontal gradient array, the first-component intermediate parameter array being a horizontal intermediate parameter array obtained by performing a right bit shift on a sum of the first horizontal gradient array and the second horizontal gradient array, and the first-component motion refinement being a horizontal motion refinement, the method further comprising:
  obtaining a first vertical gradient array based on the first prediction signal array from the first reference picture;
  obtaining a second vertical gradient array based on the second prediction signal array from the second reference picture;
  obtaining a vertical intermediate parameter array including performing a right bit shift on a sum of the first vertical gradient array and the second vertical gradient array; and
  obtaining a vertical motion refinement based at least in part on the horizontal intermediate parameter array and the vertical intermediate parameter array;
  wherein the prediction of the current block is generated using the horizontal motion refinement and the vertical motion refinement.

15. The method of claim 14, further comprising:
  obtaining a cross-gradient correlation parameter by summing components of an elementwise multiplication of the horizontal intermediate parameter array with the vertical intermediate parameter array;
  wherein obtaining the vertical motion refinement comprises determining a product of the horizontal motion refinement and the cross-gradient correlation parameter.

16. A video decoder comprising one or more processors configured to perform:
  obtaining a first array of first-component gradients based on a first prediction signal array from a first reference picture;
  obtaining a second array of first-component gradients based on a second prediction signal array from a second reference picture;
  obtaining a first-component intermediate parameter array including performing a right bit shift on a sum of the first array of first-component gradients and the second array of first-component gradients;
  obtaining at least a first-component motion refinement based at least in part on the first-component intermediate parameter array; and
  generating a prediction of a current block in a video with bi-directional optical flow using at least the first-component motion refinement.

17. The video decoder of claim 16, wherein the first-component intermediate parameter array is a horizontal intermediate parameter array and the first-component motion refinement is a horizontal motion refinement, the decoder being further configured to perform:
- obtaining a signal-difference parameter array by a obtaining a difference between the first prediction signal array and the second prediction signal array; and
- obtaining a signal-horizontal-gradient correlation parameter by summing components of an elementwise multiplication of the signal-difference parameter array with the horizontal gradient intermediate parameter array;
- wherein obtaining the horizontal motion refinement comprises bit-shifting the signal-horizontal-gradient correlation parameter to obtain the horizontal motion refinement.

18. The video decoder of claim 17, wherein obtaining the signal-difference parameter array comprises performing a right bit shift on each of the first prediction signal array and the second prediction signal array before obtaining the difference between the first prediction signal array and the second prediction signal array.

19. The video decoder of claim 15, wherein the first component is a horizontal component, with the first array of first-component gradients being a first horizontal gradient array, the second array of first-component gradients being a second horizontal gradient array, the first-component intermediate parameter array being a horizontal intermediate parameter array obtained by performing a right bit shift on a sum of the first horizontal gradient array and the second horizontal gradient array, and the first-component motion refinement being a horizontal motion refinement, the video decoder further configured to perform:
- obtaining a first vertical gradient array based on the first prediction signal array from the first reference picture;
- obtaining a second vertical gradient array based on the second prediction signal array from the second reference picture;
- obtaining a vertical intermediate parameter array including performing a right bit shift on a sum of the first vertical gradient array and the second vertical gradient array; and
- obtaining a vertical motion refinement based at least in part on the horizontal intermediate parameter array and the vertical intermediate parameter array;
- wherein the prediction of the current block is generated using the horizontal motion refinement and the vertical motion refinement.

20. The video decoder of claim 19, further configured to perform:
- obtaining a cross-gradient correlation parameter by summing components of an elementwise multiplication of the horizontal intermediate parameter array with the vertical intermediate parameter array;
- wherein obtaining the vertical motion refinement comprises determining a product of the horizontal motion refinement and the cross-gradient correlation parameter.

* * * * *